United States Patent
Higai et al.

(12)

(10) Patent No.: US 6,548,460 B1
(45) Date of Patent: Apr. 15, 2003

(54) COATING COMPOSITION AND LUBRICATED METAL SHEETS

(75) Inventors: Kazuhiko Higai, Chiba (JP); Sachiko Suzuki, Chiba (JP); Hiroyuki Ogata, Chiba (JP); Shigeru Umino, Chiba (JP); Kazuo Mochizuki, Chiba (JP); Fuminori Mukaihara, Chiba (JP); Hideo Sasaoka, Chiba (JP); Yoshinori Gotou, Chiba (JP); Kazuo Wakasa, Chiba (JP)

(73) Assignee: Kawasaki Steel Corporation, Hyogo (JP)

( * ) Notice: Subject to any disclaimer, the term of this patent is extended or adjusted under 35 U.S.C. 154(b) by 0 days.

(21) Appl. No.: 09/581,455

(22) PCT Filed: Oct. 12, 1999

(86) PCT No.: PCT/JP99/05606

§ 371 (c)(1),
(2), (4) Date: Jun. 14, 2000

(87) PCT Pub. No.: WO00/22058

PCT Pub. Date: Apr. 20, 2000

(30) Foreign Application Priority Data

Oct. 14, 1998 (JP) .......................................... 10-291845
Mar. 31, 1999 (JP) .......................................... 11-093801

(51) Int. Cl.$^7$ .................. C10M 107/28; C10M 145/14
(52) U.S. Cl. ...................................................... 508/465
(58) Field of Search ......................................... 508/465

(56) References Cited

U.S. PATENT DOCUMENTS

| 4,016,087 | A | * | 4/1977 | Narushima et al. | .......... 508/465 |
| 5,834,408 | A | * | 11/1998 | Mishra et al. | ............... 508/469 |
| 5,851,967 | A | * | 12/1998 | Schauber et al. | ........... 508/469 |
| 6,124,249 | A | * | 9/2000 | Seebauer et al. | ........... 508/469 |
| 6,228,819 | B1 | * | 5/2001 | Shauber | ...................... 508/472 |

FOREIGN PATENT DOCUMENTS

| JP | 05278181 | * | 10/1993 |
| JP | 08012920 | * | 1/1996 |

* cited by examiner

Primary Examiner—Jacqueline V. Howard
(74) Attorney, Agent, or Firm—Young & Thompson

(57) ABSTRACT

The coating composition includes a methacrylic resin prepared by copolymerization of styrene or a substituted styrene (A), a methacrylic ester obtained from an alcohol having at least two carbon atoms and methacrylic acid (B), and an olefinic compound having at least one carboxylic group (C), in which the molar ratio thereof is 1:(0.05 to 44.5):(0.12 to 13). A metal sheet lubricated with the coating composition has superior characteristics of dissolution of the film in an alkaline solution, chemical processing, paint dryness, blocking resistance, corrosion resistance, stability of coating composition, and press formability (powdering resistance and galling resistance).

19 Claims, No Drawings

COATING COMPOSITION AND LUBRICATED METAL SHEETS

This application is a 371 of PCT/JP99/05606 Oct. 12, 1999.

BACKGROUND ART

The present invention relates to coating compositions and lubricated metal sheets having surfaces coated by the coating compositions. More particularly, the present invention relates to a coating composition and to a lubricated metal sheet having surface coated by the coating composition, in which press formability including galling resistance and powdering resistance can be improved while dissolution of the film in an alkaline solution, chemical processing, corrosion resistance, paint dryness, and blocking resistance are maintained when the coating composition is coated on a metal sheet, such as a hot rolled steel sheet, a cold rolled steel sheet, a plated steel sheet, a stainless steel sheet, or an aluminum sheet.

Heretofore, cold rolled steel sheets for deep-drawing were used for structural members and parts for automobiles and for home appliances, which require highly advanced press formability; however, in view of cost reduction, hot rolled steel sheets are recently in increasing demand by taking the place of cold rolled steel sheets, and are now required to have improved deep-drawing processing characteristics. However, since known hot rolled steel sheets are inferior to cold rolled steel sheets in terms of deep-drawing processing characteristics, it is important for hot rolled steel sheets to have improved press formability in order to be used for application such as those mentioned above.

In addition, galvanized steel sheets were used for structural members for automobiles and parts, which require highly advanced corrosion resistance; in view of cost reduction, alloy hot-dip galvanized steel sheets are recently in increasing demand by taking the place of galvanized steel sheets. However, known alloy hot-dip galvanized steel sheets are generally inferior to galvanized steel sheets because of their high dynamic friction coefficients and poor press formability.

Furthermore, recently high tensile strength steel sheets are increasing their share in the market for reducing the weight of automobile bodies. However, high tensile strength steel sheets are inferior to soft steel sheets in terms of press formability in view of mechanical characteristics, so that parts for which they may be used are limited in practice.

Inferior press formability causes the following problems when using the steel sheets described above.

That is, press conditions under which press forming can be conducted are narrowed. Galling and powdering at the sliding portion between a mold and a steel sheet occur, so that molds are contaminated and damaged, resulting in increase of mold repair frequency and in reduced quality of molded parts. In order to solve these problems, corrosion resistance oils having high lubricating properties or oils for pressing is used in some situations; however, the usage thereof causes working environment degradation and it is difficult to improve press formability so as to meet the required objectives.

Regarding aluminum sheets, even though potential demand thereof is anticipated to achieve weight reduction in automobile bodies, the application thereof is limited at present because of the inherently small elongation characteristics of aluminum sheets.

Stainless steel sheets are used in many cases for bathtubs, washing machine drums, and the like formed by deep-drawing. Currently, polyvinyl chloride film is adhered on a surface of a steel sheet opposing a die so as to prevent galling caused by contact with the mold. The problems associated with the above are that an additional step for stripping the polyvinyl chloride film from the molded part after press forming is required and environment pollution may occur depending on the manner of disposal of the stripped polyvinyl chloride film. Accordingly, in order to improve press formability for various types of steel sheets, lubricity improvement of metal sheets by applying organic resinous coatings thereon have been proposed.

Organic resinous coatings coated on metal sheets are stripped at customer sites by alkaline rinsing after press forming, that is, by dissolution of the film in and alkaline solution. Chemically processed films are then formed on the metal sheets by phosphoric acid treatment or the like followed by forming coatings thereon by a method such as electropainting or spray painting. Adhesion between an exterior coating and a metal sheet is constructed through the surface processing thus described. Another problem of metal sheets coated with organic resinous coating is corrosion occurring during storage thereof until they are used. In addition, from a cost reduction point of view which is emphasized recently, baking processing of the organic resinous coatings at lower temperatures and for shorter periods of time are anticipated, and good paint dryness thereof is also desired. In many cases, the metal sheets coated with organic resinous coatings are shaped in the form of bands or sheets immediately after film forming and are stored in conditions such that metal sheets contact each and are subjected to large loads. In this case, adhesion between the metal sheets not to be separated from each other has to be avoided when they are used, in other words, blocking resistance is also required.

Heretofore, many proposals for forming organic resinous coating compositions which have the property of dissoluting the film in an alkaline solution are disclosed in, for example, Japanese Patent Application Publication No. 5337817, Japanese Unexamined Patent Application Publication Nos. 6284193, 3203996, 5194984, and 9156029.

In order to solve the problems described above, Japanese Unexamined Patent Application Publication No. 5194984 discloses a coating composition of organic resins having a specified copolymer of styrene with maleic acid and two kinds of esters formed from an alcohol having an alkyl or an alkenyl group. However, this copolymer has low molecular weight, so that rupture strength thereof is low and also press formability is poor. When a mold temperature increases, in particular, a problem arises in that press formability is extremely deteriorated.

In Japanese Patent Application Publication No. 5337817 and in Japanese Unexamined Patent Application Publications Nos. 6284193 and 3203996, technologies for improving press formability by using a specific organic resin and for maintaining dissolution of the film in an alkaline solution by defining an acid value of carboxylic groups being present in the organic resin, are disclosed. For example, an organic resin disclosed in Japanese Patent Application Publication No. 5337817 is a water-soluble copolymer composed of an acrylic ester, methyl methacrylate, styrene, and a monomer having carboxylic groups, of which the mean molecular weight is 15,000 to 50,000, and the glass transition temperature (Tg) is 60 to 90° C. However, the technologies described above have drawbacks in that the crystallization of chemically processed film after alkaline rinsing is insufficient and press formability, especially at elevated temperature, is not satisfactory.

Japanese Unexamined Patent Application Publication No. 9156029 discloses a steel sheet having superior deep-drawing, galling resistance, and dissolution of the film imparted by a coating composition composed of an acrylic resin having a defined glass transition temperature and a defined acid value, a metallic soap, a phosphoric zinc, and a polyethylenic wax. However, since the technology described above maintains dissolution of the film in an. alkaline solution only by defining an acid value of the resin, dissolution of the film in an alkaline solution cannot been maintained when a resin having a high acid value is used, because of cross-linking reaction between the resin and the zinc at a zinc-plated surface of a steel sheet. In addition, even though a steel sheet has no plating layers, it is recently appreciated that primary corrosion resistance cannot be maintained, for example, when methyl methacrylate is used.

The problems of conventional technologies described above are summarized as follows. The objects of the present invention are to solve the above problems.

<Press Formability (Powdering Resistance, Galling Resistance)>

It is said that a mold temperature increases at least 40° C., and in some situations 100° C., by heat generated by friction and resistance against distortion during several hundreds to several thousands of continuous pressings and when performing extreme deep-drawing formation. In order to suppress this temperature increase, press forming is generally performed by applying oil over a mold; however, the mold temperature increases due to lowered cooling effects by oil concomitant with an increase of the number of press processings. Consequently, the conventional technologies have problems of mold breakage, generation of powdering, and generation of galling due to lowered lubrication effects because of the softened organic resinous coatings.

<Dissolution of the Film in an Alkaline Solution (Dissolution of the film in an Alkaline Solution and Chemical Processing)>

Adhesion between metal sheets and exterior coatings is necessarily maintained at customer sites by methods such as electropainting or electrostatic painting, following the formation of a chemically processed crystalline film by steps in the order of press forming, alkaline rinsing, and chemical processing. In order to form the chemically processed crystalline film, the organic resinous coating must be stripped; hence, to strip the coating by alkaline rinsing (dissolution of the film in an alkaline solution) before chemical processing is important.

In particular, for a galvanized steel sheet, dissolution of the film in an alkaline solution is extremely suppressed by ion bonding between zinc in plating layers and carboxylic groups included in organic resinous coatings, so that the entirety of the organic resinous coating is difficult to remove. Even when water-wettability after alkaline rinsing appears to be sufficient, problems of structures of chemically processed crystalline films and insufficient adhering amounts thereof occur. This is a common problem in the conventional technologies described above.

<Corrosion Resistance>

When carboxylic groups remains in an organic resinous coating in order to maintain dissolution of the film in an alkaline solution according to the conventional technologies described above, there is a problem of generation of rust between shipment and use of the metal sheets at customer sites due to absorption of moisture from the atmosphere into the coating.

It is an object of the present invention to provide a coating composition and a lubricated metal sheet by coating the coating composition thereon. The coating composition and the lubricated metal sheet remarkably suppress the outstanding problems of metal sheets coated with organic resinous coatings (coatings for lubrication treatment) thereon. The problems mentioned above relate to dissolution of the film in an alkaline solution, chemical processing, press formability (powdering resistance,.galling resistance), corrosion resistance, and blocking resistance.

DISCLOSURE OF INVENTION

The objects described are easily achieved by the invention according to the present invention.

An object of the present invention is to provide a coating composition comprising a methacrylic resin prepared by copolymerizing styrene or a substituted styrene (A), a methacrylic ester obtained from an alcohol having at least two carbon atoms and methacrylic acid (B), and an olefinic compound having at least one carboxylic group (C), wherein the molar ratio of (A), (B) and (C) is 1:0.05 to 44.5:0.12 to 13.

The coating composition is preferably a coating composition, wherein the methacrylic resin is mixed or graft-copolymerized with a copolymer prepared by copolymerizing styrene or a substituted styrene (A) and at least one selected from olefinic dicarboxylic monoesters (D). The coating composition is more preferably a coating composition, wherein the methacrylic resin described above is mixed or graft-copolymerized with a polyalkylene glycol ester of an olefinic compound having at least one carboxylic group (E).

The coating composition is preferably a coating composition, wherein the methacrylic resin is mixed or graft-copolymerized with a copolymer prepared by copolymerizing styrene or a substituted styrene (A), at least one selected from olefinic dicarboxylic monoesters (D), and a polyalkylene glycol ester of an olefinic compound having at least one carboxylic group (E).

The coating composition is preferably a coating composition comprising a methacrylic resin prepared by copolymerizing the monomers for the methacrylic resin and a polyalkylene glycol ester of an olefinic compound having at least one carboxylic group (E). The coating composition is more preferably a coating composition, wherein the methacrylic resin is mixed with a copolymer prepared by copolymerizing styrene or a substituted styrene (A) and at least one selected from olefinic dicarboxylic monoesters (D).

The coating composition is preferably a coating composition comprising a methacrylic resin prepared by copolymerizing the monomers for the methacrylic resin and at least one selected from olefinic dicarboxylic monoesters (D), wherein the molar ratio thereof to styrene or a substituted styrene (A) is 0.06 to 6.0. The coating composition is more preferably a coating composition, wherein the methacrylic resin is mixed or graft-copolymerized with a polyalkylene glycol ester of an olefinic compound having at least one carboxylic group (E).

The coating composition is preferably a coating composition comprising a methacrylic resin prepared by copolymerizing the monomers for the methacrylic resin, at least one selected from olefinic dicarboxylic monoesters (D), and a polyalkylene glycol ester of an olefinic compound having at least one carboxylic group (E), wherein molar ratios of at least one selected from olefinic dicarboxylic monoesters (D) and a polyalkylene glycol ester of an olefinic compound having at least one carboxylic group (E) to styrene or a substituted styrene. (A) are 0.06 to 6.0, and 0.001 to 2.7, respectively.

Every coating composition described above is preferably a coating composition which comprises at least one selected from the parent population as an additive, the parent population composed of at least one selected from the group consisting of a zinc salt, a calcium salt, and an ammonium salt of a phosphoric acid and a molybdic acid as a corrosion inhibitor, at least one selected from the group consisting of a higher carboxylic acid, a higher carboxylic ester, a metallic soap, and a polyethylenic wax as a lubricant, and at least one selected from amines having a boiling point not less than 160° C. as a neutralizer.

More preferably, every coating composition described above may further comprise at least one of alkyl phosphonic esters as a precipitation inhibitor when the coating composition includes at least one of corrosion inhibitors described above.

Another object of the present invention is to provide a lubricated metal sheet to which every coating composition described above is applied.

BEST MODE FOR CARRYING OUT THE INVENTION

Coating compositions and lubricated metal sheets according to the present invention will be described in detail.

The coating composition of the present invention comprises a predetermined methacrylic resin as a primary component, and preferably further comprises supplementary components (resins) and additives. Particularly, to enhance press formability (powdering resistance and galling resistance), corrosion resistance, and blocking resistance among the characteristics of metal sheets to be improved, a three-component copolymer based on the methacrylic resin was investigated, which includes styrene or a substituted styrene (A), a methacrylic ester obtained from an alcohol having at least two carbon atoms and methacrylic acid (B), and an olefinic compound having at least one carboxylic group (C).

To enhance dissolution of the film in an alkaline solution, chemical processing, and paint dryness, experimentation was mainly conducted as described below. That is, in addition to the methacrylic resin described above, at least one selected from olefinic dicarboxylic monoesters (D) and a polyalkylene glycol ester of an olefinic compound having at least one carboxylic group (E) were introduced into the methacrylic resin as constituent components thereof by polymerization, or were blended or graft-copolymerized with the methacrylic resin as supplementary components.

<Methacrylic Resin>

Through experiments on a methacrylic resin in view of press formability made by the inventors of the present invention, it was appreciated that a copolymer of methacrylic esters, styrenic derivatives, and olefinic compounds having at least one carboxylic group can maintain a high rupture energy level of an organic resinous coating and is effective in improving press formability. In addition, it was appreciated, when an alcohol used for esterifying methacrylic acid is limited to one having at least two carbon atoms, that corrosion resistance characteristics is effectively maintained. In contrast, when an alcohol having one carbon atom, such as methyl group is used, corrosion resistance is extremely lowered.

It is estimated that polarization of an ester group is enhanced by the presence of a methyl group, so that interaction between an ester group and water is also enhanced. An aliphatic monohydric alcohol is practical as an alcohol having at least two carbon atoms. Methacrylic esters used for the present invention are, for example, methacrylic ethyl (acronym EMA, Tg=65° C.), methacrylic isopropyl (acronym iso-PMA, Tg=81° C.), methacrylic n-butyl (acronym n-BMA, Tg=20° C.), and methacrylic isobutyl (acronym iso-BMA, Tg=67° C.).

Generally, an acrylic ester has a glass-transition temperature less than 0° C., and has poor press formability. In the present invention, a methacrylic ester is an essential component, and a methacrylic ester having a Tg not less than 0° C. is preferable due to superior press formability. Since actual press forming at customer sites is performed, in general, continuously and at high speed, the temperature of the metal sheet or the mold reaches 100° C. in some cases due to heat generated by friction and resistance against distortion of the metal sheet. Accordingly, when a copolymer having a methacrylic ester having a Tg less than 0° C. as a component is included, a soft segment is separated from the metal sheet or is melted by heat generated, so that lubricity of the entire coating is lowered. The preferable Tg range of methacrylic esters used for the present invention is 10° C. to 90° C.

A component of the methacrylic resin copolymer of the present invention, styrene or a substituted styrene (A), is an essential component to achieve corrosion resistance and also press formability because of its high humidity resistance and high glass transition temperature Tg.

A molar ratio for copolymerizing styrene or a substituted styrene (A) and a methacrylic ester obtained from an alcohol having at least two carbon atoms and methacrylic acid (B) is (A):(B)=1:(0.05 to 44.5). When the molar ratio of the methacrylic ester is less than 0.05, because of increased content of styrene or its derivatives, press formability.and corrosion resistance are enhanced; however, dissolution of the film in an alkaline solution is suppressed even when an acid value is within a predetermined number which is described later, and shelf life of the coating composition tends to be shorter. In contrast, when the molar ratio of the methacrylic ester is greater than 44.5, rupture strength of a coating and press formability are lowered, and at the same time, corrosion resistance is also deteriorated since hydrophobic characteristics of the coatings are weakened. A more preferable molar ratio of the copolymer, (A):(B), is 1:(0.3 to 4.2), and a further preferable molar ratio is 1:(0.73 to 2.93).

Another component of the methacrylic resin of the present invention is an olefinic compound having at least one carboxylic group (C), for example, an ethylenic unsaturated carboxylic acid having one or two carboxylic groups, such as acrylic acid, methacrylic acid, maleic acid, and itaconic acid.

A molar ratio for copolymerizing styrene or a substituted styrene (A) and an olefinic compound having at least one carboxylic group (C) is (A):(C) =1:(0.12 to 13). When the molar ratio of (C) is less than 0.12, dissolution of the film in an alkaline solution is poor. In contrast, when the molar ratio of (C) is greater than 13, primary corrosion resistance is poor. A more preferable molar ratio of the copolymer, (A):(C), is 1:(0.35 to 11.6), and a further preferable molar ratio is 1:(4.7 to 10.7).

Since the methacrylic resin of the present invention has carboxylic groups in a molecule by having (C) component, water solubility can be achieved by neutralization with a base such as ammonia or an amine. Consequently, the coating composition of the present invention can have dissolution of the film in an alkaline solution, which is one of the important characteristics of coating compositions.

From the above point of view, the methacrylic resin of the present invention is preferably adjusted to have an acid value of 20 to 300 (mg-KOH/g) before neutralization. When the acid value is less than 20 (mg-KOH/g), dissolution of the film in an alkaline solution of the coating by an alkaline solution is extremely suppressed, and in addition, water solubility of the methacrylic resin is so low that water-soluble coating composition is difficult to produce. In contrast, when the acid value is greater than 300 (mg-KOH/g), corrosion resistance of the coating is extremely deteriorated, and effects of styrene and other added corrosion inhibitors cannot be observed. A more preferable acid value is 25 to 250 (mg-KOH/g), and a further preferable acid value is 100 to 230 (mg-KOH/g). For maintaining the preferred acid value, methacrylic acid of 4 to 50 parts by weight in a methacrylic resin of 100 parts by weight is recommended when methacrylic acid is used as an olefinic compound having at least one carboxylic group (C).

A preferable molecular weight of the methacrylic resin of the present invention is 10,000 to 60,000 in mean molecular weight. In the range mentioned above, lubrication effects of the coating are effectively performed so as to be suitable for press formability.

The methacrylic resin of the present invention can be obtained by a known copolymerization method in a water-soluble solvent. An example of copolymerization of the methacrylic resin is as follows. In a nitrogen atmosphere, a methacrylic ester and styrene with a preferable weight ratio thereof from 10:90 to 90:10 are added in a water-soluble solvent (such as butyl cellosolve) controlled at 80 to 140° C., and a monomer having carboxyl groups is dripped for copolymerization with a polymerization initiator for 4 to 5 hours so that an acid value is preferably maintained between 30 and 200 (mg-KOH/g). Finally, a predetermined methacrylic resin can be obtained by heating and stirring for 2 to 8 hours at the same temperature so as to complete copolymerization. Later, the solution is cooled to 55 to 60° C., and is then neutralized by a base such as ammonia or an amine to obtain water-soluble solution. Hence, a surfactant for emulsification is not required to be used. Therefore, the methacrylic resin is free of problems of lowered corrosion resistance of the coating and press formability caused by residual surfactants in the coating after drying.

In addition, due to the nature of emulsion coating compositions including surfactants, the temperature for drying and baking is required to be not less than Tg+20° C., that is, a coating can be obtained only by drying at an even higher temperature. In other words, coating compositions including surfactants are inferior in paint dryness; however, the methacrylic resin of the present invention is free of the problems described above.

Olefinic Dicarboxyl Monoesters (D) and AD Copolymer

According to the present invention, at least one selected from olefinic dicarboxylic monoesters (D) or a copolymer (hereinafter referred to as "AD copolymer") of styrene or a substituted styrene (A) with at least one selected from olefinic dicarboxylic monoesters (D) is preferably blended or graft-copolymerized with the methacrylic resin.

As a dicarboxylic acid component of the olefinic dicarboxyl monoesters, maleic acid, fumaric acid, and itaconic acid are preferable. A monoalkyl ester component is preferably formed by an alcohol having one to four carbon atoms. By a combination described above, superior dissolution of the film in an alkaline solution can be achieved. The reason for this is that carboxyl groups of the AD copolymer or (D) work as sites for a base included as a neutralizer to remain. In the AD copolymer, a molar ratio of styrene to maleic acid or the like is preferably (75:25) to (1:99). When styrene content is less than 1 mole percent, rupture strength of the organic resinous coating is lowered, and as a result, press formability, especially press formability at an elevated temperature (powdering resistance) is deteriorated. In contrast, when styrene content is greater than 75 mole percent, carboxyl groups are extremely reduced, and as a result, dissolution of the film in an alkaline solution is suppressed. A more preferable AD copolymer has a molar ratio of styrene to maleic acid or the like from (75:25) to (20:80).

For maintaining good dissolution of the film in an alkaline solution, the AD copolymer is preferably adjusted to have at least one carboxyl group, such as maleic acid or the like, in one molecule. Therefore, when the AD copolymer is produced by a solution polymerization or the like, it is preferable to esterify maleic acid or the like by an alcohol for which mole equivalents are less than that of maleic acid or the like.

A molecular weight of the AD copolymer is preferably 500 to 10,000 as a mean molecular weight. When the molecular weight is less than 500, rupture strength of the organic resinous coating is extremely lowered, and as a result, press formability is seriously deteriorated. In contrast, when the molecular weight is greater than 10,000, an effect for improving dissolution of the film in an alkaline solution cannot be expected. A more preferable AD copolymer has one to seven carboxylic groups in one molecule and a molecular weight of 500 to 1,000.

The AD copolymer can be obtained in a water-soluble solvent by a known method, such as a solution polymerization, a bulk polymerization, an emulsion polymerization, or a vapor-phase polymerization. An example of production by a known solution polymerization is disclosed as follows. In a water-soluble solvent, such as butyl cellosolve, at 80 to 140° C. under a nitrogen atmosphere, copolymerization of styrene and maleic resin or the like is carried out by using a polymerization initiator for 4 to 5 hours, and is then heated and stirred at the same temperature for 2 to 3 hours. An example of vapor-phase polymerization for obtaining a relatively low molecular weight is disclosed as follows, that is, a copolymerization is carried out by introducing gas components to be copolymerized with or without a polymerization catalyst in an ultra high-pressure reactor heated at 100 to 300° C.

It is preferable to neutralize the AD copolymer or at least one selected from olefinic dicarboxylic monoesters (D) by ammonia to obtain a water-soluble composition. A preferable additive amount of ammonia is 0.6 to 4 equivalents versus 1 equivalent of acid in a resinous solid component of the AD copolymer and (D). When the additive amount of ammonia is less than 0.6 equivalent, stability of coating composition is lowered. When the additive amount of ammonia is greater than 4 equivalents, rupture strength is lowered and press formability is deteriorated. A more preferable additive amount of ammonia is 0.8 to 2.5 equivalents.

A Polyalkylene Glycol Ester of an Olefinic Compound having at Least One Carboxylic Group (E)

In addition to the AD copolymer and at least one selected from olefinic dicarboxylic monoesters (D), more preferable coating composition having superior dissolution of the film in an alkaline solution can be obtained by blending or copolymerizing a polyalkylene glycol ester of an olefinic compound having at least one carboxylic group (E) with the methacrylic resin.

In the combination of the methacrylic resin of the present invention with the AD copolymer or (D), in some case, a neutralized state is disrupted when the coating is baked or is stored after baking, so that carboxyl groups increase and dissolution of the film in an alkaline solution is deteriorated. A polyalkylene glycol ester of an olefinic compound having at least one carboxylic group (E), differing from the AD copolymer and (D), has good water solubility even when not neutralized by a base. When (E) is added to the coating composition of the present invention, since (E) is not influenced by dissociation to carboxyl groups, suppression of dissolution of the film in an alkaline solution can be prevented.

A polyalkylene glycol ester of an olefinic compound having at least one carboxylic group (E) is preferably an ethylenic unsaturated carboxyl ester of a polyalkylene glycol monoalkyl ether. An alkylene group of a polyalkylene glycol are more preferably an ethylenic group and a trimethylenic group having two to three carbon atoms. Degree of polymerization (m) of a polyalkylene glycol is preferably 1 to 20. When degree of polymerization is greater than 20, corrosion resistance may be deteriorated. An alkyl group of a monoalkyl ether are more preferably a methyl group, an ethyl group, a propyl group, and an isopropyl group, having one to three carbon atoms. A preferable ethylenic unsaturated carboxyl acid is acrylic acid, methacrylic acid, maleic acid, itaconic acid, fumaric acid, and the like.

An example of a production method is one in which product prepared by an addition polymerization of 1 to 20 moles of an alkylene oxide having at least two carbon atoms is etherified at an alcohol of end-groups thereof by alkyl group having one to three carbon atoms, and is then esterified by reacting with the ethylenic unsaturated carboxylic acid.

A coating composition of a polyalkylene glycol ester of an olefinic compound having at least one carboxylic group (E) combined with the methacrylic resin, and the AD copolymer or (D), shows superior characteristics as anticipated.

In view of maintaining water solubility, it can be considered to use a polyalkylene glycol instead of (E) of the present invention. However, since end-groups of a polyalkylene glycol are hydroxide groups, dehydration between components of the composition may occur to form three-dimensional linkage, that is, gelation, when the composition is stored for a long period of time. In contrast, a long term shelf life of the coating composition of the present invention can be ensured by etherifying hydroxide groups in end-groups of a polyethylene glycol by an alcohol (an alkyl alcohol such as methyl alcohol or ethyl alcohol) and/or esterifying hydroxide groups of end-groups of a polyethylene glycol by an olefinic compound having at least one carboxyl group.

Preferable amounts used for the coating composition of the methacrylic resin, the AD copolymer, at least one selected from olefinic dicarboxylic monoesters (D), and a polyalkylene glycol ester of an olefinic compound having at least one carboxylic group (E) are as follows. The amount of methacrylic resin is 90 to 40 weight percent and more preferably 85 to 50 weight percent, the amount of AD copolymer or (D) is 5 to 40 weight percent and more preferably 10 to 35 weight percent, and the amount of (E) is 5 to 20 weight percent and more preferably 5 to 15 weight percent, in which the sum of resinous solid content of the four components is preferably 100 weight percent by optionally combining above four components for use. When the amount of methacrylic resin is greater than 90 weight percent, dissolution of the film in an alkaline solution is suppressed, and when less than 40 weight percent, corrosion resistance tends to be lowered. When the amount of AD copolymer or (D) is less than 5 weight percent, dissolution of the film in an alkaline solution is suppressed, and when greater than 40 weight percent, corrosion resistance tends to be deteriorated. In addition, when (E) is less than 5 weight percent, sufficient dissolution of the film in an alkaline solution cannot be obtained, and when greater than 20 weight percent, corrosion resistance tends to be deteriorated.

The coating composition of the present invention is prepared, for example, as described below. The methacrylic resin, the AD copolymer or (D), and (E) are dispersed in a predetermined volume of water and heated to 60 to 70° C., and this is then neutralized by adding a predetermined volume of ammonia. Moreover, a base, such as triethanol amine, is added to the methacrylic resin, in a ratio of 0.25 equivalent of a base to an acid equivalent of the methacrylic resin, for neutralization. If necessary, additives described below are preferably added.

The methacrylic resin according to the present invention sufficiently meets the requirements for the coating composition described above; however, the AD copolymer or (D), or (E) may be simply blended with the methacrylic resin for constituting the coating composition. Furthermore, various copolymers copolymerized by a combination of styrene or a substituted styrene (A) as a monomer of the AD copolymer, at least one selected from olefinic dicarboxylic monoesters (D), and (E), may be blended with the methacrylic resin. In addition, (A), (D), and (E) may be polymerized as components of the methacrylic resin when they are within a range of a predetermined molar ratio for polymerization. By copolymerizing a polyalkylene glycol ester of an olefinic compound having at least one carboxylic group (E), low molecular weight components in the coating composition are reduced, so that press formability is preferably further improved.

The AD copolymer and monomers thereof, (A) and (D), and (E), can achieve even greater dissolution of the film in an alkaline solution by blending than by copolymerizing with monomers which compose other copolymer or polymer.

The coating composition of the mixture of the AD copolymer and the copolymer are produced by the following method, the copolymer comprising styrene or a substituted styrene (A), a methacrylic ester obtained from an alcohol having at least two carbon atoms and methacrylic acid (B), at least one of an olefinic dicarboxyl monoesters (C), and a polyalkylene glycol ester of an olefinic compound having at least one carboxylic group (E).

In the case of a solution polymerization, for example, 23 parts of styrene, 24 parts of methacrylic butyl, 23 parts of methacrylic acid, and 10 parts of a polyethylene glycol monomethyl ester of methacrylic acid are fed in water-soluble solvent (e.g., butyl cellosolve) at 80 to 140° C. under an ambient nitrogen atmosphere, and are pre-mixed. The mixture is then copolymerized for 4 to 5 hours with dripping a polymerization initiator, then 20 parts of the AD copolymer (e.g., obtained from 10 parts of styrene and 10 parts of monomethyl maleate) is added to the mixture, and is heated and stirred for 2 to 8 hours.

The resulting coating composition was measured by gel permeation chromatography (GPC) after the composition was extracted by using chloroform and was filtrated by a filter with a pore size of 0.45 $\mu$m. The composition was verified to be a mixture of two components since two peaks were observed in the spectrum. The ratio of the components, the methacrylic resin (ABCE copolymer) to the added AD copolymer, was 80 to 20. After the coating composition was cooled to 55 to 60° C., ammonia was added in a ratio of 0.5 to 4 equivalents of ammonia to 1 equivalent of the acid contained in the copolymer, or in addition, 0.1 to 0.5 equivalent of an amine having a high boiling point or a hydroxide was added in order to neutralize and solubilize the composition.

When the coating composition of the present invention is a mixture of the AD copolymer and the copolymer of the components constituting the methacrylic resin and (E), the acid value of the composition is a sum of individual acid values calculated by multiplying the acid values of the AD copolymer and the copolymer before neutralization by individual fractions.

When the coating composition of the present invention is a mixture of the methacrylic resin, the AD copolymer, and (E), the acid values of the composition is a sum of individual acid values calculated by multiplying the acid values of the methacrylic resin, the AD copolymer, and (E) before neutralization by individual fractions.

When the coating composition of the present invention is a mixture of (E) and the copolymer of the components constituting the methacrylic resin and the components constituting the AD copolymer, the acid value of the composition is a sum of individual acid values calculated by multiplying the acid values of the components constituting the methacrylic resin and the components constituting the AD copolymer before neutralization by individual fractions.

When the coating composition of the present invention is a copolymer of the components constituting the AD copolymer, the components constituting the methacrylic resin, and the components constituting the AD copolymer, or is a mixture of AD copolymer therewith, the acid value is a sum of individual acid values calculated by multiplying the acid values of the copolymer [meaning unknown] of the components constituting the AD copolymer, the components constituting the methacrylic resin, and components constituting the AD copolymer, and the acid value of the methacrylic resin, which are unneutralized, by individual fractions.

An acid value of the coating composition of the present invention is preferably adjusted in the range of 20 to 300 (mg-KOH/g). An acid value is more preferably 25 to 250 (mg-KOH/g), and further preferably 100 to 230 (mg-KOH/g).

When the acid value of the mixture of the copolymer of (A), (B), (C), and (E), and the AD copolymer is less than 20 (mg-KOH/g), for example, dissolution of the film in an alkaline solution is extremely deteriorated. Moreover, it is difficult to make a coating composition by water solubilization from the composition described above. In contrast, the acid value of the composition is greater than 300 (mg-KOH/g), corrosion resistance is extremely deteriorated and effects to be performed by styrene or other additives of corrosion inhibitors cannot been observed.

A mean molecular weight of the methacrylic resin constituting the coating composition of the present invention is preferably 10,000 to 70,000, and more preferably 10,000 to 50,000. When the mean molecular weight is less than 10,000, press formability of a coated metal sheet is deteriorated, when it is greater than 70,000, viscosity of the coating composition increases and coating tends to be difficult.

A glass transition temperature (Tg) of the coating composition is preferably not less than 0° C. When the Tg is less than 0° C., coating of the coating composition formed on a surface of a metal sheet is separated therefrom or melted by heat generated at press forming, so that lubricity is deteriorated. A preferable Tg is 30 to 100° C.

<Additives>

Resins having carboxyl groups included in the coating composition of the present invention are preferably neutralized by a base such as ammonia or an amine. Thus, the coating composition of the present invention does not require to use surfactants. Additives including neutralizers, which are generally used for ordinary coating compositions, are not rejected to use for the coating composition of the present invention.

However, preferable additives.as neutralizers, lubricants, corrosion inhibitors, and precipitation inhibitors for the coating composition of the present invention will be described.

Neutralizer

When a metal sheet to be coated by the coating composition is an alloy hot-dip galvanized steel sheet, the interaction between zinc in plating layers and carboxylic groups of the coating composition tends to suppress dissolution of the film in an alkaline solution. In order to improve corrosion resistance and press formability of metal sheets, coating compositions are required to have enhanced rupture strength of organic resinous coating; however, when the Tg and the molecular weight of the methacrylic resin are increased for the purpose mentioned above, dissolution of the film in an alkaline solution of the organic resinous coatings is suppressed. In contrast, by adding specifically selected neutralizers, the AD copolymer, and (E) having ether bond, dissolution of the film in an alkaline solution can be improved.

When alkaline rinsing by customers are performed at less than the Tg of the methacrylic resin and in a relatively short period of time, dissolution of the film in an alkaline solution is poor, even carboxylic groups which are not neutralized by neutralizers are increased. Accordingly, when carboxyl groups can be maintained in a neutralized state after applying organic resinous coating, dissolution of the film in an alkaline solution can be improved. Therefore, when a part of carboxyl groups are neutralized by a base which is difficult to evaporate, such as an amine having high boiling point, or by an inorganic base of hydroxide, ammonia, or the like, hydrophilic products in organic resinous coatings can be preferably increased. A single neutralizer or a plurality of neutralizers combined together may be used for the purposes described above. Neutralizers employed in alkaline rinsing may assist alkaline elements in permeating into organic resinous coatings and ensure dissolution of the film in an alkaline solution at low temperature and in a short period of time.

When the boiling points of amines to be used are less than 30° C., amines evaporate during drying of organic resinous coatings at room temperature, so that dissolution of the film in an alkaline solution is suppressed. A preferable boiling point of the amines is not less than 100° C., and more preferably not less than 160° C. A recommended neutralizer used for the coating composition of the present invention is at least one of amines having a boiling point not less than 160° C. Amines having boiling points not less than 30° C. are isopropyl amine (boiling point 32° C.), diethyl amine (boiling point 56° C.), N,N'-dimethylethanol amine (boiling point 130° C.), monoethanol amine (boiling point 170° C.), tri-isopropanol amine (boiling point 305° C.), tri-ethanol amine (boiling point 360° C.), and the like. Alkanol amines and alkyl amines are more preferable. Hydroxides are sodium hydroxide and potassium hydroxide.

The additive amount of neutralizer, in a ratio to an equivalent of acid contained in resinous solid content of the methacrylic resin, are preferably 0.6 to 4.0 equivalents of ammonia, or 0.05 to 0.5 equivalent of amines having boiling points not less than 30° C. or hydroxides. When the equivalent of amines having boiling points not less than 30° C. is less than 0.05, dissolution of the film in an alkaline solution in a short period of time under alkaline rinsing is difficult to maintain. In contrast, when the equivalent of amines having boiling points not less than 30° C. is greater than 0.5, rupture strength of the coating is lowered, press formability is lowered, and productivity is lowered. In addition, blocking resistance is lowered. More preferable additive amount of amines having boiling points greater than 30° C. or hydroxide is 0.1 to 0.4 equivalent. When the additive amount of ammonia is less than 0.6 equivalent, solubilization by neutralization is difficult; when it is greater than 4.0, rupture strength of coating is deteriorated and lubrication characteristics tend to be degraded.

Lubricant

At least one selected from the group consisting of higher aliphatic carboxylic acids, higher aliphatic carboxylic esters, metallic soaps, and polyethylenic waxes is preferable as a lubricant to be added for the coating composition of the present invention. Examples of the lubricants are higher aliphatic acids, such as lauric acid, palmitic acid, stearic acid, oleic acid, and the like, and esters thereof, and so-called "metallic soaps", that is, salts of alkaline earth metals, such as calcium and barium, with higher aliphatic carboxylic acids described above. Furthermore, solid lubricant and/or waxes may be blended with the above. Solid lubricants are, for example, graphite, molybdenum disulfide, talc, fluorine-containing resin, boron nitride, calcium carbonate, melamine, and isocyanuric adducts.

Waxes are a polyethylene wax, a petroleum paraffin wax, a grease of plants and animals, a higher aliphatic carboxyl acids, a higher alcohol, esters of a higher aliphatic carboxyl acid and a higher alcohol, a higher aliphatic carboxyl amide, an amine salt of a higher aliphatic carboxyl acid. For maintaining lubricant film to be solidified, waxes having boiling points not less than 45° C. are preferable. For raising boiling point, there is a method to eliminate double bonds by hydrogenation.

A preferable additive amount of lubricants is 3 to 50 weight percent versus total resinous solid content of the coating composition, and more preferably 5 to 30 weight percent. Within the range mentioned above, press formability is superior without lowering dissolution of the film in an alkaline solution, and corrosion resistance is superior without extremely lowering stability of coating composition.

Corrosion Inhibitor

Preferable corrosion inhibitors for the coating composition according to the present invention are at least one selected from the group consisting of a ziric salt, a calcium salt, and an ammonium salt of a phosphoric acid and a molybdic acid. A preferable additive amount of corrosion inhibitors is 3 to 30 percent by weight versus total resinous solid content, and more preferably 5 to 20 weight percent. Within the range mentioned above, corrosion resistance is superior without extremely reducing stability of coating composition.

Precipitation Inhibitor

Particularly when a zinc salt, a calcium salt, and an ammonia salt of a phosphoric acid and a molybdic acid are used as corrosion inhibitors, those mentioned above are apt to precipitate due to heavier specific gravity thereof than that of the solvent used. In this case, at least one selected from alkyl phosphonic esters ($RPO_3R'_2$), which work as a precipitation inhibitor, is preferably added.

R is a saturated hydrocarbon group or an unsaturated hydrocarbon group having ten to fifty carbon atoms, regardless of whether it is straight chain or branched, and more specifically, a-olefin having forty carbon atoms is an example.

In the case of alkyl phosphonic dialkyl esters, R' may be same or different; R' is a saturated hydrocarbon group or an unsaturated hydrocarbon group having one to eight carbon atoms. Preferable R' are $CH_3$, $C_3H_7$, $C_5H_{11}$, $C_8H_{17}$ and the like, and more preferably, α-olefin having five or eight carbon atoms.

In the case of alkyl phosphonic monoalkyl esters, one R' is hydrogen atom and the other R' is a group equivalent to that of alkyl phosphoric dialkyl esters as descried above. Additive amount of at least one selected from alkyl phosphonic acid esters by weight percent to total resinous solid content of the coating composition is preferably (1:99) to (20:80), and more preferably, (5:95) to (15:85). When the additive amount is less than 1 weight percent, effects of the precipitation inhibitor cannot be observed, and when larger than 20 weight percent, aggregation force of the coating is reduced and film peeling, so-called "powdering" during processing, occurs.

When a monoalkyl ester is used with a dialkyl ester in the ratio from (10:90) to (90:10), remarkable effects can be observed. When the amount of monoalkyl esters is less than 10 weight percent, stability of coating composition may be lowered in some cases, and when greater than 90 weight percent, dissolution of the film in an alkaline solution is suppressed due to increased adsorption of hydroxide groups on surfaces of steel sheets.

In addition to the additives described above, solvents of hydrocarbons or the like, coloring agents, pigments, dyestuffs and the like may be added to the coating composition of the present invention, and additives which are used for common coating compositions, such as oleophilic agents and extreme pressure additives, may also be added.

<Lubricated Metal Sheet>

The present invention provides lubricated metal sheets by applying the coating composition described above on metal sheets, such as various types of steel sheets, surface treated steel sheets, and aluminum sheets. The metal sheets include metal sheets in the form of bands, but are not specifically limited. As examples of the metal sheets, there may be mentioned hot-dip galvanized steel sheets, alloy hot-dip galvanized steel sheets, hot rolled steel sheets, cold rolled steel sheets, galvanized steel sheets, Zn–Ni electroplating steel sheets, aluminum sheets, and stainless steel sheets.

When the coating composition of the present invention is applied on metal sheets, coating amount per the surface is preferably 0.5 to 5 $g/m^2$ in dry weight. When the coating amount is less than 0.5 $g/m^2$, irregular surfaces of metal sheets cannot be flattened, so that the effects of press formability and corrosion resistance by the present invention cannot be realized. When the coating amount is greater than 5 $g/m^2$, powdering is generated during press forming. A more preferable range is 0.5 to 3 $g/m^2$.

Coating can be performed by a known coating method, such as roller coating, spray coating, dip coating, and brush coating. Drying conditions are at temperatures of 40° C. to 200° C., and drying time is for approximately 1 to 90 seconds.

EXAMPLES

The present invention will be described in detail by Examples (Tables 1 to 14) and Comparative Examples (Tables 15 and 16).

<Method for Preparing Test Pieces>

Seven kinds of metal sheets S to Y were degreased by alkaline rinsing, and both surfaces of each metal sheet were coated with the coating compositions listed in Tables 1, 3, 5, 7, 9, 11, 13, and 15. Each coating weight in a dry state was adjusted to be 1.5 g/m² per surface and the film was dried by a hot-blast dryer so that temperature of the sheet reached 60° C. in 10 seconds. Test pieces were prepared by coating an antirust oil (16.0 centi-stoke/40° C.) of 0.5 to 1.0 g/m² on both surfaces of the metal sheets. Seven types of neutralizers described below, a to g, for the coating compositions were used, and each additive amount is shown in the tables. Mw in the tables is the mean molecular weight of the resins. Stearic calcium and a polyethylene wax were added to the coating compositions in amounts of 5 weight percent and 10 weight percent to total resinous solid component, respectively. In addition, phosphoric zinc as an antirust agent at 5 weight percent was added in a same manner as described above, and Octyl hentetracontyl phosphonate (p) and Dioctyl hentetracontyl phosphonate (q) as a precipitation inhibitor were optionally used, as shown in Tables 1, 3, 5, 7, 9, 11, and 13.

Press formability, corrosion resistance, dissolution of the film in an alkaline solution, chemical processing, blocking resistance, paint dryness, and stability of coating composition were investigated for each test piece thus obtained. The results are shown in Tables 2, 4, 6, 8, 10, 12, 14, and 16.

Metal sheets
S: alloy hot-dip galvanized steel sheet
T: hot rolled steel sheet
U: cold rolled steel sheet
V: stainless steel sheet
W: aluminum sheet
X: galvanized steel sheet
Y: hot-dip galvanized steel sheet
Neutralizers
a: ammonia (boiling point −33° C.)
b: isopropyl amine (boiling point 32° C.)
c: diethyl amine (boiling point 56° C.)
d: N,N-dimethyl ethanol amine (boiling point 130° C.)
e: monoethanol amine (boiling point 170° C.)
f: triisopropanol amine (boiling point 305° C.)
g: triethanol amine (boiling point 360° C.)
<Evaluation Method>

Each characteristic of the test pieces was measured in the following ways.
(1) Press Formability
Press Formability at Room Temperature (Limiting Blank Holding Force, Galling Resistance, Powdering Resistance)

The test pieces were obtained by performing cylindrical deep-drawing pressing at constant mold temperature of 25° C. under the following press conditions by using an Erichsen cup drawing tester.

Punch diameter: 33 mm diameter (Cylinder, cylinder with bead)
Drawing dice shoulder curvature: 2 mmR
Blank diameter: Cylinder 68 mm diameter, Cylinder with bead 68 mm diameter
Limiting blank holding force:
Maximum formable tonnage without rupture Evaluation Standard for Galling Resistance Galling was evaluated in accordance with the following four levels by the observation of side wall portions of test pieces.
◎: No galling
○: Slight galling
Δ: Relatively high galling
x: High galling Evaluation Standard for Powdering Resistance Powdering resistance was evaluated in accordance with the following three levels by the observation of side wall portions of test pieces.
○: No powdering
Δ: Slight powdering
x: Relatively high powdering Press Formability at Elevated Temperature (Limiting Blank Holding Force, Galling Resistance, Powdering Resistance)

The test pieces were obtained by performing cylindrical deep-drawing pressing at constant mold temperature of 80° C. under the following press conditions by using an Erichsen cup drawing tester.

Punch diameter: 33 mm diameter (Cylinder)
Drawing dice shoulder curvature: 2 mmR
Blank diameter: Cylinder 68 mm diameter,
Drawing speed: 60 mm/sec
Limiting blank holding force:
Maximum formable tonnage without rupture Evaluation Standard for Galling Resistance Galling was evaluated in accordance with the following four levels by the observation at side wall portions of test pieces.
○: No galling
○: Slight galling
Δ: Relatively high galling
x: High galling Evaluation standard for Powdering Resistance Powdering resistance was evaluated in accordance with the following three levels by the observation of side wall portions of test pieces.
○: No powdering
Δ: Slight powdering
x: Relatively high powdering
(2) Corrosion Resistance Since corrosion characteristics of plated steel sheet and non-plated steel sheet differ from each other, non-plated steel sheet was evaluated primarily by stack test, and plated steel sheet was evaluated by the Salt Spray Test (SST). Each evaluation is described below.

SST: Generation of white rust (red rust in case of cold rolled steel sheets and hot rolled steel sheets) was evaluated by the ratio of area of rust 17 hours after atomizing water containing sodium chloride at 3 weight percent, in accordance with Japan Industrial Standard (JIS) Z2371, on test pieces coated at 2 g/m² by the antirust oil (DAPHNE Oil Coat Z-5: Idemitsu Kosan Co., Ltd.) Stack Test: Time for generation of red rust in 5 percent of the area thereof after leaving two test pieces of 70 mm by 150 mm stacked together under 50 kg/cm² load at 50° C. was measured. Between the test pieces, 2 ml of water was dripped. Not less than 70 hours was determined to be a good result.
(3) Dissolution of the Film in an Alkaline Solution Test pieces were degreased by atomizing, for 10 seconds at 1 kg/cm² atomizing pressure, alkaline rinsing solution at a concentration of 3 weight percent (Degreasing solution: Fine Cleaner 4460: Nihon Parkerizing Co., Ltd.) controlled at 40° C. Wetted areas of the test pieces were observed by the naked eye after dipping them into water. Dissolution of the film in an alkaline solution was determined in accordance with the following three levels.

○: Water-wetted portion 100% of a metal sheet surface

Δ: Water-wetted portion not less than 95% of metal sheet surface x: Water-wetted portion; less than 95% of metal sheet surface (4) Chemical Processing Test pieces were degreased by atomizing, for 10 seconds at 1 kg/cm2 atomizing pressure, alkaline rinsing solution at a concentration of 3 weight percent (Degreasing solution: Fine Cleaner 4460: Nihon Parkerizing Co., Ltd.) controlled at 40° C. Crystal structures of the chemically processed films were examined by scanning electron microscope (1,000x magnification) after performing chemical processing by dipping the test pieces for 120 seconds into the chemical processing solution (PB-L3020M: Nihon Parkerizing Co., Ltd.) controlled at 43° C. The films thus processed were compared with films that were coated in the same conditions by a coating composition other than the coating composition of the present invention.

○: Good chemically processed film equivalent to a processed film of a non-coated steel sheet Δ: Slightly finer or coarser changes in the structure size, compared to a processed film of a non-coated steel sheet x: No generation of chemically processed film (5) Blocking Resistance Two test pieces fastened together with coating applied surfaces facing each other by 300 kg·cm torque were left in an isothermal oven at 60° C. for 6 hours. After tearing the two stacked test pieces apart, blocking resistance was evaluated by adhering state of the coating in accordance with following four levels.

○: No blocking

○: Slight blocking

Δ: Blocking x: High blocking (6) Paint Dryness

One method for evaluating paint dryness of film immediately after baking was to determine tackiness by finger touch. The other method for evaluation was as follows. Two test pieces were fastened together by 300 kg·cm torque immediately after baking so that coating applied surfaces faced each other and were left at room temperature for 6 hours. The degree of peeling and change in appearance of each test piece when torque was released were evaluated at four levels.

○: No tackiness. Test pieces separate by their own weight when torque is released, and no changes in appearance.

○: No tackiness. Test pieces separate by their own weight when torque is released, and slight changes in appearance.

Δ: Slight tackiness. Test pieces will not separate by their own weight when torque is released.

x: Tackiness. Test pieces will not separate by their own weight when torque is released (7) Stability of Coating Composition The coating compositions of the present invention in a 200-ml graduated cylinder were stored in an oven controlled at 50° C. for one month. After storage, the separated state of the coating composition was observed by the naked eye. In addition, the viscosity of the coating composition was compared with the original viscosity before storage for evaluation thereof in accordance with the following four levels.

○: No separation of the coating composition, and no viscosity change

○: No separation of the coating composition, and slight increase in viscosity

Δ: Slight precipitation and scum, and increase in viscosity x: Substantial precipitation and scum, and increase in viscosity

TABLE 1

| | | Methacrylic resin | | | | | Neutralizer for methacrylic resin | |
| | Type | Monomer composition for polymer (mole %) | | | Acid | Molecular | Type and | Equivalent |
| No. | of steel | A | B | C | value | weight | mixing ratio | carboxyl group |
|---|---|---|---|---|---|---|---|---|
| 1 | T | Styrene (22) | n-Butyl methacrylate (61) | Methacrylic acid (17) | 150 | 35000 | a | 1.3 |
| 2 | T | Styrene (22) | n-Butyl methacrylate (61) | Methacrylic acid (17) | 150 | 35000 | a | 1.3 |
| 3 | U | Styrene (22) | n-Butyl methacrylate (61) | Methacrylic acid (17) | 150 | 35000 | a | 1.3 |
| 4 | S | Styrene (22) | n-Butyl methacrylate (61) | Methacrylic acid (17) | 150 | 35000 | a | 1.3 |
| 5 | V | Styrene (22) | n-Butyl methacrylate (61) | Methacrylic acid (17) | 150 | 35000 | a | 1.3 |
| 6 | T | Styrene (19) | n-Butyl methacrylate (44) | Methacrylic acid (37) | 150 | 35000 | a | 1.3 |
| 7 | T | Styrene (70) | n-Butyl methacrylate (10) | Methacrylic acid (20) | 150 | 35000 | a | 1.3 |
| 8 | T | Styrene (39) | n-Butyl methacrylate (43) | Methacrylic acid (18) | 150 | 35000 | a | 1.3 |
| 9 | T | Styrene (13) | n-Butyl methacrylate (70) | Methacrylic acid (17) | 150 | 35000 | a | 1.3 |
| 10 | T | Styrene (8) | n-Butyl methacrylate (80) | Methacrylic acid (12) | 150 | 35000 | a | 1.3 |
| 11 | T | Styrene (13) | iso-Butyl methacrylate (80) | Acrylic acid (7) | 100 | 30000 | a | 1.3 |
| 12 | T | Styrene (74) | n-Butyl methacrylate (17) | Methacrylic acid (9) | 70 | 35000 | a | 1.3 |
| 13 | T | Styrene (20) | n-Butyl methacrylate (70) | Methacrylic acid (10) | 100 | 30000 | a | 1.3 |
| 14 | T | Methyl styrene (30) | iso-Propyl methacrylate (58) | Itaconic acid (12) | 100 | 20000 | a | 1.3 |
| 15 | T | Styrene (54) | n-Butyl methacrylate (31) | Acrylic acid (15) | 140 | 40000 | a | 1.3 |
| 16 | T | Styrene (27) | n-Butyl methacrylate (59) | Acrylic acid (15) | 140 | 20000 | a | 1.3 |
| 17 | T | Styrene (28) | n-Butyl methacrylate (58) | Methacrylic acid (14) | 130 | 35000 | a | 1.3 |

TABLE 2

| | Press formability | | | | | | | | | Corrosion resistance Stack | Dissolution of the film in an alkaline | Chemical | Blocking | Paint | Stability of coating |
|---|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | | | | | | |
| No. | *1 (t) | *2 | *3 | *1 (t) | *2 | *3 | *1 (t) | *2 | *3 | (H) | solution | processing | resistance | Dryness | composition |
| 1 | 2 | ⊚ | △ | 1 | ⊚ | △ | 1 | ⊚ | △ | >100 | ○ | ⊚ | ⊚ | ⊚ | ○ |
| 2 | 2 | ⊚ | △ | 1 | ⊚ | △ | 1 | ⊚ | △ | >100 | ○ | ⊚ | ⊚ | ⊚ | ○ |
| 3 | 2 | ⊚ | △ | 1 | ⊚ | △ | 1 | ⊚ | △ | >100 | ○ | ⊚ | ⊚ | ⊚ | ○ |
| 4 | 2 | ⊚ | △ | 1 | ⊚ | △ | 1 | ⊚ | △ | >100 | ○ | ⊚ | ⊚ | ⊚ | ○ |
| 5 | 2 | ⊚ | △ | 1 | ⊚ | △ | 1 | ⊚ | △ | >100 | ○ | ⊚ | ⊚ | ⊚ | ○ |
| 6 | 2 | ⊚ | △ | 1 | ⊚ | △ | 1 | ⊚ | △ | >100 | ○ | ⊚ | ⊚ | ⊚ | ○ |
| 7 | 2 | ⊚ | △ | 1 | ⊚ | △ | 1 | ⊚ | △ | >100 | △ | ⊚ | ⊚ | ⊚ | ○ |
| 8 | 2 | ⊚ | △ | 1 | ⊚ | △ | 1 | ⊚ | △ | >100 | ○ | ⊚ | ⊚ | ⊚ | ○ |
| 9 | 2 | ⊚ | △ | 1 | ⊚ | △ | 1 | ⊚ | △ | >100 | ○ | ⊚ | ⊚ | ⊚ | ○ |
| 10 | 2 | ⊚ | △ | 1 | ⊚ | △ | 1 | ⊚ | △ | 80 | ○ | ⊚ | ⊚ | ⊚ | ○ |
| 11 | 2 | ⊚ | △ | 1 | ⊚ | △ | 1 | ⊚ | △ | >100 | ○ | ⊚ | ⊚ | ⊚ | ○ |
| 12 | 2 | ⊚ | △ | 1 | ⊚ | △ | 1 | ⊚ | △ | >100 | ○ | ⊚ | ⊚ | ⊚ | ○ |
| 13 | 2 | ⊚ | △ | 1 | ⊚ | △ | 1 | ⊚ | △ | >100 | ○ | ⊚ | ⊚ | ⊚ | ○ |
| 14 | 2 | ⊚ | △ | 1 | ⊚ | △ | 1 | ⊚ | △ | >100 | ○ | ⊚ | ⊚ | ⊚ | ○ |
| 15 | 2 | ⊚ | △ | 1 | ⊚ | △ | 1 | ⊚ | △ | >100 | ○ | ⊚ | ⊚ | ⊚ | ○ |
| 16 | 2 | ⊚ | △ | 1 | ⊚ | △ | 1 | ⊚ | △ | >100 | ○ | ⊚ | ⊚ | ⊚ | ○ |
| 17 | 2 | ⊚ | △ | 1 | ⊚ | △ | 1 | ⊚ | △ | >100 | ○ | ⊚ | ⊚ | ⊚ | ○ |

*1 Limiting blank holding force
*2 Galling resistance
*3 Powdering resistance

TABLE 3

| | | Methacrylic resin | | | | | Neutralizer for methacrylic resin | | Precipitation inhibitor | |
|---|---|---|---|---|---|---|---|---|---|---|
| | | | | | | | | | Additive amount to solid | Type and mixing ratio |
| No. | Type of steel | Monomer composition for polymer (mole %) | | | Acid value | Molecular weight | Type and mixing ratio | Equivalent to carboxyl group | component of coating composition (weight %) | p:q |
| | | A | B | C | | | | | | |
| 18 | T | Styrene (22) | n-Butyl methacrylate (61) | Methacrylic acid (17) | 150 | 35000 | a:g = 75:25 | 1.3 | 10 | 50:50 |
| 19 | T | Styrene (22) | n-Butyl methacrylate (61) | Methacrylic acid (17) | 150 | 35000 | a:g = 75:25 | 1.3 | 10 | 50:50 |
| 20 | U | Styrene (22) | n-Butyl methacrylate (61) | Methacrylic acid (17) | 150 | 35000 | a:g = 75:25 | 1.3 | 10 | 50:50 |
| 21 | S | Styrene (22) | n-Butyl methacrylate (61) | Methacrylic acid (17) | 150 | 35000 | a:g = 75:25 | 1.3 | 10 | 50:50 |
| 22 | V | Styrene (22) | n-Butyl methacrylate (61) | Methacrylic acid (17) | 150 | 35000 | a:g = 75:25 | 1.3 | 10 | 50:50 |
| 23 | T | Styrene (22) | n-Butyl methacrylate (61) | Methacrylic acid (17) | 150 | 35000 | a:g = 75:25 | 1.3 | 10 | 50:50 |
| 24 | T | Styrene (70) | n-Butyl methacrylate (10) | Methacrylic acid (20) | 150 | 35000 | a:g = 75:25 | 1.3 | 10 | 50:50 |
| 25 | T | Styrene (39) | n-Butyl methacrylate (43) | Methacrylic acid (18) | 150 | 35000 | a:g = 75:25 | 1.3 | 10 | 50:50 |
| 26 | T | Styrene (13) | n-Butyl methacrylate (70) | Methacrylic acid (17) | 150 | 35000 | a:g = 75:25 | 1.3 | 10 | 50:50 |
| 27 | T | Styrene (9) | n-Butyl methacrylate (74) | Methacrylic acid (17) | 150 | 35000 | a:g = 75:25 | 1.3 | 10 | 50:50 |
| 28 | T | Styrene (22) | n-Butyl methacrylate (61) | Methacrylic acid (17) | 150 | 35000 | a:g = 75:25 | 1.3 | 10 | 50:50 |
| 29 | T | Styrene (22) | n-Butyl methacrylate (61) | Methacrylic acid (17) | 150 | 35000 | a:g = 75:25 | 1.3 | 10 | 50:50 |
| 30 | T | Styrene (22) | n-Butyl methacrylate (61) | Methacrylic acid (17) | 150 | 35000 | a:g = 75:25 | 1.3 | 10 | 50:50 |
| 31 | T | Styrene (22) | n-Butyl methacrylate (61) | Methacrylic acid (17) | 150 | 35000 | a:g = 92:8 | 1.3 | 10 | 50:50 |
| 32 | T | Styrene (22) | n-Butyl methacrylate (61) | Methacrylic acid (17) | 150 | 35000 | a:g = 45:55 | 1.3 | 10 | 50:50 |
| 33 | T | Styrene (22) | n-Butyl methacrylate (61) | Methacrylic acid (17) | 150 | 35000 | a:g = 75:25 | 1.3 | 5 | 50:50 |
| 34 | T | Styrene (22) | n-Butyl methacrylate (61) | Methacrylic acid (17) | 150 | 35000 | a:g = 75:25 | 1.3 | 10 | 50:50 |
| 35 | T | Styrene (22) | n-Butyl methacrylate (61) | Methacrylic acid (17) | 150 | 35000 | a:g = 75:25 | 1.3 | 15 | 50:50 |

TABLE 4

| | Press formability | | | | | | | | | Corrosion resistance Stack | Dissolution of the film in an alkaline solution | Chemical processing | Blocking resistance | Paint Dryness | Stability of coating composition |
|---|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | | | | | | |
| No. | *1 (t) | *2 | *3 | *1 (t) | *2 | *3 | *1 (t) | *2 | *3 | (H) | | | | | |
| 18 | 2 | ◎ | ○ | 1 | ◎ | ○ | 1 | ◎ | ○ | >100 | ○ | ◎ | ◎ | ◎ | ◎ |
| 19 | 2 | ◎ | ○ | 1 | ◎ | ○ | 1 | ◎ | ○ | >100 | ○ | ◎ | ◎ | ◎ | ◎ |
| 20 | 2 | ◎ | ○ | 2 | ◎ | ○ | 2 | ◎ | ○ | >100 | ○ | ◎ | ◎ | ◎ | ◎ |
| 21 | 2 | ◎ | ○ | 2 | ◎ | ○ | 2 | ◎ | ○ | >100 | ○ | ◎ | ◎ | ◎ | ◎ |
| 22 | 2 | ◎ | ○ | 1 | ◎ | ○ | 1 | ◎ | ○ | >100 | ○ | ◎ | ◎ | ◎ | ◎ |
| 23 | 2 | ◎ | ○ | 1 | ◎ | ○ | 1 | ◎ | ○ | >100 | ○ | ◎ | ◎ | ◎ | ◎ |
| 24 | 2 | ◎ | ○ | 1 | ◎ | ○ | 1 | ◎ | ○ | >100 | ○ | ◎ | ◎ | ◎ | ◎ |
| 25 | 2 | ◎ | ○ | 1 | ◎ | ○ | 1 | ◎ | ○ | >100 | ○ | ◎ | ◎ | ◎ | ◎ |
| 26 | 2 | ◎ | ○ | 1 | ◎ | ○ | 1 | ◎ | ○ | >100 | ○ | ◎ | ◎ | ◎ | ◎ |
| 27 | 2 | ◎ | ○ | 1 | ◎ | ○ | 1 | ◎ | ○ | 80 | ○ | ◎ | ◎ | ◎ | ◎ |
| 28 | 2 | ◎ | ○ | 1 | ◎ | ○ | 1 | ◎ | ○ | >100 | ○ | ◎ | ◎ | ◎ | ◎ |
| 29 | 2 | ◎ | ○ | 1 | ◎ | ○ | 1 | ◎ | ○ | >100 | ○ | ◎ | ◎ | ◎ | ◎ |
| 30 | 2 | ◎ | ○ | 1 | ◎ | ○ | 1 | ◎ | ○ | >100 | ○ | ◎ | ◎ | ◎ | ◎ |
| 31 | 2 | ◎ | ○ | 1 | ◎ | ○ | 1 | ◎ | ○ | >100 | ○ | ◎ | ◎ | ◎ | ◎ |
| 32 | 2 | ◎ | ○ | 1 | ◎ | ○ | 1 | ◎ | ○ | 80 | ○ | ◎ | ◎ | ◎ | ◎ |
| 33 | 2 | ◎ | ○ | 1 | ◎ | ○ | 1 | ◎ | ○ | >100 | ○ | ◎ | ◎ | ◎ | ◎ |
| 34 | 2 | ◎ | ○ | 1 | ◎ | ○ | 1 | ◎ | ○ | >100 | ○ | ◎ | ◎ | ◎ | ◎ |
| 35 | 2 | ◎ | ○ | 1 | ◎ | ○ | 1 | ◎ | ○ | >100 | ○ | ◎ | ◎ | ◎ | ◎ |

*1 Limiting blank holding force
*2 Galling resistance
*3 Powdering resistance

TABLE 5

| | | Methacrylic resin | | | | | Neutralizer for methacrylic resin | | Precipitation inhibitor | |
|---|---|---|---|---|---|---|---|---|---|---|
| | Type of steel | Monomer composition for polymer (mole %) | | | Acid value | Molecular weight | Type and mixing ratio | Equivalent to carboxyl group | Additive amount to solid component of coating composition (weight %) p:q | Type and mixing ratio |
| No. | | A | B | C | | | | | | |
| 36 | T | Styrene (22) | n-Butyl methacrylate (61) | Methacrylic acid (17) | 150 | 35000 | a:g = 75:25 | 1.3 | 30 | 50:50 |
| 37 | T | Styrene (22) | n-Butyl methacrylate (61) | Methacrylic acid (17) | 150 | 35000 | a:g = 75:25 | 1.3 | 10 | 100:0 |
| 38 | T | Styrene (22) | n-Butyl methacrylate (61) | Methacrylic acid (17) | 150 | 35000 | a:g = 75:25 | 1.3 | 10 | 17:83 |
| 39 | T | Styrene (22) | n-Butyl methacrylate (61) | Methacrylic acid (17) | 150 | 35000 | a:g = 75:25 | 1.3 | 10 | 8:92 |
| 40 | T | Styrene (22) | n-Butyl methacrylate (61) | Methacrylic acid (17) | 150 | 35000 | a:g = 75:25 | 1.3 | 10 | 0:100 |
| 41 | T | Styrene (24) | iso-Butyl methacrylate (65) | Acrylic acid (11) | 150 | 35000 | a:g = 75:25 | 1.3 | 10 | 50:50 |
| 42 | T | Styrene (24) | n-Butyl methacrylate (65) | Acrylic acid (11) | 150 | 35000 | a:g = 75:25 | 1.3 | 10 | 50:50 |
| 43 | T | Styrene (22) | n-Butyl methacrylate (61) | Methacrylic acid (17) | 150 | 35000 | a:g = 95:5 | 1.3 | 10 | 50:50 |
| 44 | T | Styrene (22) | n-Butyl methacrylate (61) | Methacrylic acid (17) | 150 | 35000 | a:g = 20:80 | 1.3 | 10 | 50:50 |
| 45 | T | Styrene (22) | n-Butyl methacrylate (61) | Methacrylic acid (17) | 150 | 35000 | a:g = 75:25 | 0.7 | 10 | 50:50 |
| 46 | T | Styrene (22) | n-Butyl methacrylate (61) | Methacrylic acid (17) | 150 | 35000 | a:g = 75:25 | 1.7 | 10 | 50:50 |
| 47 | T | Styrene (22) | n-Butyl methacrylate (61) | Methacrylic acid (17) | 150 | 10000 | a:g = 75:25 | 1.3 | 10 | 50:50 |
| 48 | T | Styrene (22) | n-Butyl methacrylate (61) | Methacrylic acid (17) | 150 | 50000 | a:g = 75:25 | 1.3 | 10 | 50:50 |
| 49 | T | Styrene (25) | n-Butyl methacrylate (69) | Methacrylic acid (16) | 50 | 35000 | a:g = 75:25 | 1.3 | 10 | 50:50 |

TABLE 6

| | Press formability | | | | | | | | | Corrosion resistance Stack | Dissolution of the film in an alkaline solution | Chemical processing | Blocking resistance | Paint Dryness | Stability of coating composition |
|---|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | | | | | | |
| No. | *1 (t) | *2 | *3 | *1 (t) | *2 | *3 | *1 (t) | *2 | *3 | (H) | | | | | |
| 36 | 2 | ⊚ | ○ | 1 | △ | ○ | 1 | △ | ○ | >100 | ○ | ⊚ | ⊚ | ⊚ | ⊚ |
| 37 | 2 | ⊚ | ○ | 1 | ⊚ | ○ | 1 | ⊚ | ○ | 80 | ○ | ⊚ | ⊚ | ⊚ | ○ |
| 38 | 2 | ⊚ | ○ | 1 | ⊚ | ○ | 1 | ⊚ | ○ | >100 | ○ | ⊚ | ⊚ | ⊚ | ○ |
| 39 | 2 | ⊚ | ○ | 1 | ⊚ | ○ | 1 | ⊚ | ○ | >100 | ○ | ⊚ | ⊚ | ⊚ | ○ |
| 40 | 2 | ⊚ | ○ | 1 | ⊚ | ○ | 1 | ⊚ | ○ | >100 | ○ | ⊚ | ⊚ | ⊚ | ○ |
| 41 | 2 | ⊚ | ○ | 1 | ⊚ | ○ | 1 | ⊚ | ○ | >100 | ○ | ⊚ | ⊚ | ⊚ | ○ |
| 42 | 2 | ⊚ | ○ | 1 | ⊚ | ○ | 1 | ⊚ | ○ | >100 | ○ | ⊚ | ⊚ | ⊚ | ○ |
| 43 | 2 | ⊚ | ○ | 1 | ○ | ○ | 1 | ○ | ○ | >100 | ○ | ⊚ | ⊚ | ⊚ | ○ |
| 44 | 2 | ○ | ○ | 1 | △ | ○ | 1 | △ | ○ | 80 | ○ | ⊚ | ⊚ | ⊚ | ○ |
| 45 | 2 | ⊚ | ○ | 1 | ⊚ | ○ | 1 | ⊚ | ○ | >100 | ○ | ⊚ | ⊚ | ⊚ | ○ |
| 46 | 2 | ⊚ | ○ | 1 | ⊚ | ○ | 1 | ⊚ | ○ | >100 | ○ | ⊚ | ⊚ | ⊚ | ○ |
| 47 | 2 | ⊚ | ○ | 1 | ⊚ | ○ | 1 | ⊚ | ○ | >100 | ○ | ⊚ | ⊚ | ⊚ | ○ |
| 48 | 2 | ⊚ | ○ | 1 | ⊚ | ○ | 1 | ⊚ | ○ | >100 | ○ | ⊚ | ⊚ | ⊚ | ○ |
| 49 | 2 | ⊚ | ○ | 1 | ⊚ | ○ | 1 | ⊚ | ○ | >100 | ○ | ⊚ | ⊚ | ⊚ | ○ |

*1 Limiting blank holding force
*2 Galling resistance
*3 Powdering resistance

TABLE 7-1

| | | Methacrylic resin | | | | | Neutralizer for methacrylic resin | |
|---|---|---|---|---|---|---|---|---|
| No. | Type of steel | Monomer composition for polymer (mole %) | | | Acid value | Molecular weight | Type and mixing ratio | Equivalent carboxyl group |
| | | A | B | C | | | | |
| 50 | S | Styrene (22) | n-Butyl methacrylate (61) | Methacrylic acid (17) | 150 | 35000 | a:g = 75:25 | 1.3 |
| 51 | T | Styrene (22) | n-Butyl methacrylate (61) | Methacrylic acid (17) | 150 | 35000 | a:g = 75:25 | 1.3 |
| 52 | U | Styrene (22) | n-Butyl methacrylate (61) | Methacrylic acid (17) | 150 | 35000 | a:g = 75:25 | 1.3 |
| 53 | V | Styrene (22) | n-Butyl methacrylate (61) | Methacrylic acid (17) | 150 | 35000 | a:g = 75:25 | 1.3 |
| 54 | W | Styrene (22) | n-Butyl methacrylate (61) | Methacrylic acid (17) | 150 | 35000 | a:g = 75:25 | 1.3 |
| 55 | X | Styrene (22) | n-Butyl methacrylate (61) | Methacrylic acid (17) | 150 | 35000 | a:g = 75:25 | 1.1 |
| 56 | S | Methyl styrene (19) | iso-Propyl methacrylate (44) | Itaconic acid (37) | 150 | 35000 | a:g = 75:25 | 1.1 |
| 57 | S | Styrene (24) | iso-Butyl methacrylate (65) | Acrylic acid (11) | 150 | 35000 | a:g = 75:25 | 1.1 |
| 58 | S | Styrene (25) | n-Butyl methacrylate (59) | Acrylic acid (17) | 150 | 35000 | a:g = 75:25 | 1.1 |
| 59 | S | Styrene (80) | n-Butyl methacrylate (10) | Methacrylic acid (10) | 80 | 35000 | a:g = 75:25 | 0.7 |
| 60 | S | Styrene (6) | n-Butyl methacrylate (74) | Methacrylic acid (20) | 190 | 35000 | a:g = 75:25 | 0.7 |
| 61 | S | Styrene (22) | n-Butyl methacrylate (61) | Methacrylic acid (17) | 150 | 10000 | a:g = 75:25 | 1.3 |
| 62 | S | Styrene (22) | n-Butyl methacrylate (61) | Methacrylic acid (17) | 150 | 60000 | a:g = 75:25 | 1.3 |
| 63 | S | Styrene (35) | n-Butyl methacrylate (46) | Methacrylic acid (19) | 160 | 25000 | a:g = 75:25 | 1.3 |
| 64 | S | Styrene (20) | n-Butyl methacrylate (62) | Methacrylic acid (18) | 160 | 25000 | a:g = 75:25 | 1.3 |
| 65 | S | Styrene (20) | n-Butyl methacrylate (62) | Methacrylic acid (18) | 160 | 25000 | a:g = 75:25 | 1.3 |
| 66 | S | Styrene (20) | n-Butyl methacrylate (62) | Methacrylic acid (18) | 160 | 25000 | a:g = 75:25 | 1.3 |
| 67 | S | Styrene (20) | n-Butyl methacrylate (62) | Methacrylic acid (18) | 160 | 25000 | a:g = 75:25 | 1.3 |
| 68 | S | Styrene (13) | n-Butyl methacrylate (69) | Methacrylic acid (18) | 170 | 30000 | a:g = 90:10 | 1.3 |
| 69 | S | Styrene (13) | n-Butyl methacrylate (69) | Methacrylic acid (18) | 170 | 30000 | a:g = 50:50 | 1.3 |
| 70 | S | Styrene (22) | n-Butyl methacrylate (61) | Methacrylic acid (17) | 150 | 35000 | a:g = 75:25 | 0.75 |

TABLE 7-2

| | Supplementary component | | | | | | | |
|---|---|---|---|---|---|---|---|---|
| | AD copolymer | | | | Mixing ratio to methacrylic resin and method therefor | | Precipitation inhibitor | Additive amount to solid component of coating resin (weight %) |
| No. | A | D | Mw | Equivalent of neutralizer (a) to acid equivalent | AD:AD copolymer ADE:ADE copolymer | Method Mix: Mixing Grf: Polymerizing | Type and mixing ratio p:q | |
| 50 | Styrene (50) | Monomethyl maleate (50) | 1500 | 2.0 | AD = 25 | Mix | 50:50 | 5 |
| 51 | Styrene (50) | Monomethyl maleate (50) | 1500 | 2.0 | AD = 25 | Mix | 50:50 | 5 |
| 52 | Styrene (50) | Monomethyl maleate (50) | 1500 | 2.0 | AD = 25 | Mix | 50:50 | 5 |

TABLE 7-2-continued

| | Supplementary component | | | | Mixing ratio to methacrylic resin and method therefor | | Precipitation inhibitor | |
|---|---|---|---|---|---|---|---|---|
| | AD copolymer | | | | | | | Additive amount to |
| No. | A | D | Mw | Equivalent of neutralizer (a) to acid equivalent | AD:AD copolymer ADE:ADE copolymer | Method Mix: Mixing Grf: Polymerizing | Type and mixing ratio p:q | solid component of coating resin (weight %) |
| 53 | Styrene (50) | Monomethyl maleate (50) | 1500 | 2.0 | AD = 25 | Mix | 50:50 | 5 |
| 54 | Styrene (50) | Monomethyl maleate (50) | 1500 | 2.0 | AD = 25 | Mix | 50:50 | 5 |
| 55 | Styrene (50) | Monomethyl maleate (50) | 1500 | 2.0 | AD = 25 | Mix | 50:50 | 5 |
| 56 | Styrene (50) | Monomethyl maleate (50) | 1500 | 1.8 | AD = 10 | Mix | 20:80 | 5 |
| 57 | Styrene (50) | Monomethyl maleate (50) | 2000 | 1.8 | AD = 10 | Mix | 20:80 | 5 |
| 58 | Styrene (50) | Monomethyl maleate (50) | 2000 | 1.8 | AD = 10 | Grf | 20:80 | 5 |
| 59 | Styrene (50) | Monomethyl maleate (50) | 1000 | 1.5 | AD = 40 | Mix | 60:40 | 10 |
| 60 | Styrene (50) | Monomethyl maleate (50) | 1000 | 1.5 | AD = 40 | Grf | 60:40 | 10 |
| 61 | Styrene (50) | Monomethyl maleate (50) | 1500 | 2.0 | AD = 40 | Grf | 50:50 | 5 |
| 62 | Styrene (50) | Maleic acid (50) | 1500 | 2.0 | AD = 25 | Grf | 50:50 | 5 |
| 63 | Styrene (50) | Monomethyl maleate (50) | 8000 | 1.8 | AD = 25 | Mix | 50:50 | 5 |
| 64 | Styrene (50) | Monomethyl maleate (50) | 8000 | 1.8 | AD = 25 | Mix | 50:50 | 5 |
| 65 | Styrene (50) | Monomethyl maleate (50) | 8000 | 1.8 | AD = 25 | Mix | 50:50 | 5 |
| 66 | Styrene (50) | Monomethyl maleate (50) | 8000 | 1.8 | AD = 25 | Mix | 50:50 | 5 |
| 67 | Styrene (50) | Monomethyl maleate (50) | 2000 | 1.8 | AD = 25 | Mix | 50:50 | 5 |
| 68 | Styrene (50) | Monomethyl maleate (50) | 2000 | 1.8 | AD = 25 | Mix | 50:50 | 5 |
| 69 | Styrene (50) | Monomethyl maleate (50) | 2000 | 1.8 | AD = 25 | Grf | 50:50 | 5 |
| 70 | Styrene (50) | Monomethyl maleate (50) | 1500 | 1.5 | AD = 25 | Grf | 50:50 | 5 |

TABLE 8

| | Press formability | | | | | | | | | Corrosion resistance SST | | | | | | |
|---|---|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | Area of rust generated 17 | Dissolution of the film in an alkaline | Chemical | Blocking | Paint | Stability of coating |
| No. | *1 (t) | *2 | *3 | *1 (t) | *2 | *3 | *1 (t) | *2 | *3 | hours later | solution | processing | resistance | Dryness | composition |
| 50 | 4 | ⊚ | ○ | 3 | ⊚ | ○ | 2 | ⊚ | ○ | 5 | ○ | ⊚ | ⊚ | ⊚ | ⊚ |
| 51 | 2 | ⊚ | △ | 1 | ⊚ | △ | 1 | ⊚ | △ | 40 | ○ | ⊚ | ⊚ | ⊚ | ⊚ |
| 52 | 5 | ⊚ | ⊚ | 4 | ⊚ | ⊚ | 3 | ⊚ | ⊚ | 40 | ○ | ⊚ | ⊚ | ⊚ | ⊚ |
| 53 | 3 | ⊚ | ⊚ | 2 | ⊚ | ⊚ | 1 | ⊚ | ⊚ | 0 | ○ | ⊚ | ⊚ | ⊚ | ⊚ |
| 54 | 3 | ⊚ | ⊚ | 2 | ⊚ | ⊚ | 1 | ⊚ | ⊚ | 0 | ○ | ⊚ | ⊚ | ⊚ | ⊚ |
| 55 | 4 | ⊚ | ○ | 3 | ⊚ | ○ | 2 | ⊚ | ○ | 5 | ○ | ⊚ | ⊚ | ⊚ | ⊚ |
| 56 | 4.5 | ⊚ | ○ | 3 | ⊚ | ○ | 2 | ⊚ | ○ | 5 | ○ | ⊚ | ⊚ | ⊚ | ⊚ |
| 57 | 4.5 | ⊚ | ○ | 3 | ⊚ | ○ | 2 | ⊚ | ○ | 5 | ○ | ⊚ | ⊚ | ⊚ | ⊚ |
| 58 | 4 | ⊚ | ○ | 3 | ⊚ | ○ | 2 | ⊚ | ○ | 5 | ○ | ⊚ | ⊚ | ⊚ | ⊚ |
| 59 | 4 | ⊚ | ○ | 3 | ⊚ | ○ | 2 | ⊚ | ○ | 0 | △ | ○ | ⊚ | ⊚ | ⊚ |
| 60 | 4 | ⊚ | ○ | 3 | ⊚ | ○ | 2 | ⊚ | ○ | 10 | ○ | ⊚ | ⊚ | ⊚ | ⊚ |
| 61 | 3 | ⊚ | ○ | 2 | ⊚ | ○ | 1 | ⊚ | ○ | 5 | ○ | ⊚ | ⊚ | ⊚ | ⊚ |
| 62 | 5 | ⊚ | ○ | 4 | ⊚ | ○ | 3 | ⊚ | ○ | 5 | △ | ○ | ⊚ | ⊚ | ⊚ |
| 63 | 4 | ⊚ | ○ | 3 | ⊚ | ○ | 2 | ⊚ | ○ | 5 | △ | ⊚ | ⊚ | ⊚ | ⊚ |
| 64 | 4 | ⊚ | ○ | 3 | ⊚ | ○ | 2 | ⊚ | ○ | 5 | ○ | ⊚ | ⊚ | ⊚ | ⊚ |
| 65 | 4 | ⊚ | ○ | 3 | ⊚ | ○ | 2 | ⊚ | ○ | 5 | ○ | ⊚ | ⊚ | ⊚ | ⊚ |
| 66 | 4 | ⊚ | ○ | 3 | ⊚ | ○ | 2 | ⊚ | ○ | 5 | ○ | ⊚ | ⊚ | ⊚ | ⊚ |
| 67 | 4 | ⊚ | ○ | 3 | ⊚ | ○ | 2 | ⊚ | ○ | 5 | △ | ○ | ⊚ | ⊚ | ⊚ |
| 68 | 4 | ⊚ | ○ | 3 | ⊚ | ○ | 2 | ⊚ | ○ | 5 | ○ | ⊚ | ⊚ | ⊚ | ⊚ |
| 69 | 4 | ⊚ | ○ | 3 | ⊚ | ○ | 2 | ⊚ | ○ | 5 | △ | ○ | ⊚ | ⊚ | ⊚ |
| 70 | 4 | ⊚ | ○ | 3 | ⊚ | ○ | 2 | ⊚ | ○ | 5 | ○ | ⊚ | ⊚ | ⊚ | ⊚ |

*1 Limiting blank holding force
*2 Galling resistance
*3 Powdering resistance

TABLE 9-1

| | | Methacrylic resin | | | | | Neutralizer for methacrylic resin | |
|---|---|---|---|---|---|---|---|---|
| | Type | Monomer composition for polymer (mole %) | | | Acid | Molecular | Type and | Equivalent |
| No. | of steel | A | B | C | value | weight | mixing ratio | carboxyl group |
| 71 | S | Styrene (22) | n-Butyl methacrylate (61) | Methacrylic acid (17) | 150 | 35000 | a:g = 75:25 | 1.5 |
| 72 | S | Styrene (22) | n-Butyl methacrylate (61) | Methacrylic acid (17) | 150 | 35000 | a:g = 75:25 | 1.3 |
| 73 | S | Styrene (22) | n-Butyl methacrylate (61) | Methacrylic acid (17) | 150 | 35000 | a:g = 75:25 | 1.3 |
| 74 | S | Styrene (22) | n-Butyl methacrylate (61) | Methacrylic acid (17) | 150 | 35000 | a:g = 75:25 | 1.3 |
| 75 | S | Styrene (22) | n-Butyl methacrylate (61) | Methacrylic acid (17) | 150 | 35000 | a:g = 75:25 | 1.3 |
| 76 | S | Styrene (22) | n-Butyl methacrylate (61) | Methacrylic acid (17) | 150 | 35000 | a:g = 75:25 | 1.3 |
| 77 | S | Styrene (22) | n-Butyl methacrylate (61) | Methacrylic acid (17) | 150 | 35000 | a:g = 75:25 | 1.3 |
| 78 | S | Styrene (22) | n-Butyl methacrylate (61) | Methacrylic acid (17) | 150 | 35000 | a:g = 75:25 | 1.3 |
| 79 | S | Styrene (22) | n-Butyl methacrylate (61) | Methacrylic acid (17) | 150 | 35000 | a:g = 75:25 | 1.3 |
| 80 | S | Styrene (22) | n-Butyl methacrylate (61) | Methacrylic acid (17) | 150 | 35000 | a:g = 75:25 | 1.3 |
| 81 | S | Styrene (22) | n-Butyl methacrylate (61) | Methacrylic acid (17) | 150 | 35000 | a:g = 75:25 | 1.3 |
| 82 | S | Styrene (22) | n-Butyl methacrylate (61) | Methacrylic acid (17) | 150 | 35000 | a:g = 75:25 | 1.3 |
| 83 | S | Styrene (22) | n-Butyl methacrylate (61) | Methacrylic acid (17) | 150 | 35000 | a:g = 75:25 | 1.3 |
| 84 | S | Styrene (22) | n-Butyl methacrylate (61) | Methacrylic acid (17) | 150 | 35000 | a:g = 75:25 | 1.3 |
| 85 | S | Styrene (22) | n-Butyl methacrylate (61) | Methacrylic acid (17) | 150 | 35000 | a:g = 75:25 | 1.3 |
| 86 | S | Styrene (22) | n-Butyl methacrylate (61) | Methacrylic acid (17) | 150 | 35000 | a:g = 75:25 | 1.3 |
| 87 | S | Styrene (22) | n-Butyl methacrylate (61) | Methacrylic acid (17) | 150 | 35000 | a:g = 75:25 | 1.3 |
| 88 | S | Styrene (22) | n-Butyl methacrylate (61) | Methacrylic acid (17) | 150 | 35000 | a:g = 75:25 | 1.3 |
| 89 | S | Styrene (22) | n-Butyl methacrylate (61) | Methacrylic acid (17) | 150 | 35000 | a:g = 75:25 | 1.3 |
| 90 | S | Styrene (22) | n-Butyl methacrylate (61) | Methacrylic acid (17) | 150 | 35000 | a:g = 75:25 | 1.3 |
| 91 | S | Styrene (24) | n-Butyl methacrylate (66) | Methacrylic acid (10) | 100 | 30000 | a | 1.3 |
| 92 | S | Styrene (22) | n-Butyl methacrylate (61) | Methacrylic acid (17) | 150 | 35000 | a:g = 75:25 | 1.3 |
| 93 | S | Styrene (20) | n-Butyl methacrylate (44) | Methacrylic acid (19) | 180 | 35000 | a:g = 75:25 | 1.3 |

TABLE 9-2

| | Supplementary component | | | | Mixing ratio to methacrylic resin and method therefor | | Precipitation inhibitor | |
|---|---|---|---|---|---|---|---|---|
| | AD copolymer | | | | | | | Additive amount to |
| | | | | Equivalent of neutralizer (a) to | AD:AD copoly- mer ADE:ADE | Method Mix: Mixing Grf: | Type and mixing ratio | solid component of coating resin |
| No. | A | D | Mw | acid equivalent | copolymer | Polymerizing | p:q | (weight %) |
| 71 | Styrene (50) | Monomethyl maleate (50) | 1500 | 4.0 | AD = 25 | Grf | 50:50 | 5 |
| 72 | Styrene (90) | Monomethyl maleate (10) | 1500 | 2.0 | AD = 25 | Grf | 50:50 | 5 |
| 73 | Styrene (10) | Monomethyl maleate (99) | 1500 | 2.0 | AD = 25 | Grf | 50:50 | 5 |
| 74 | Styrene (50) | Monomethyl maleate (50) | 1500 | 2.0 | AD = 25 | Grf | 50:50 | 5 |
| 75 | Styrene (50) | Monomethyl maleate (50) | 200 | 2.0 | AD = 25 | Grf | 50:50 | 5 |
| 76 | Styrene (50) | Monomethyl maleate (50) | 500 | 2.0 | AD = 25 | Grf | 50:50 | 5 |
| 77 | Styrene (50) | Monomethyl maleate (50) | 10000 | 2.0 | AD = 25 | Grf | 50:50 | 5 |
| 78 | Styrene (50) | Monomethyl maleate (50) | 20000 | 2.0 | AD = 25 | Grf | 50:50 | 5 |
| 79 | Styrene (50) | Monomethyl maleate (50) | 1500 | 2.0 | AD = 10 | Grf | 50:50 | 5 |
| 80 | Styrene (50) | Monomethyl maleate (50) | 1500 | 2.0 | AD = 50 | Mix | 50:50 | 5 |
| 81 | Styrene (50) | Monomethyl maleate (50) | 1500 | 2.0 | AD = 70 | Mix | 50:50 | 5 |
| 82 | Styrene (50) | Monomethyl maleate (50) | 1500 | 2.0 | AD = 25 | Mix | 50:50 | 5 |
| 83 | Styrene (50) | Monomethyl maleate (50) | 1500 | 2.0 | AD = 25 | Mix | 50:50 | 5 |
| 84 | Styrene (50) | Monomethyl maleate (50) | 1500 | 2.0 | AD = 25 | Mix | 50:50 | 5 |
| 85 | Styrene (50) | Monomethyl maleate (50) | 1500 | 2.0 | AD = 25 | Mix | — | 0 |
| 86 | Styrene (50) | Monomethyl maleate (50) | 1500 | 2.0 | AD = 25 | Mix | 100:0 | 10 |
| 87 | Styrene (50) | Monomethyl maleate (50) | 1500 | 2.0 | AD = 25 | Mix | 0:100 | 10 |
| 88 | Styrene (50) | Monomethyl maleate (50) | 1500 | 2.0 | AD = 25 | Mix | 50:50 | 1 |
| 89 | Styrene (50) | Monomethyl maleate (50) | 1500 | 2.0 | AD = 25 | Mix | 50:50 | 20 |
| 90 | Styrene (50) | Itaconic acid (50) | 1500 | 2.0 | AD = 25 | Mix | 50:50 | 5 |
| 91 | Styrene (50) | Monomethyl maleate (50) | 1500 | 2.0 | AD = 20 | Mix | — | 0 |
| 92 | Styrene (50) | Maleic acid (50) | 1500 | 2.0 | AD = 25 | Mix | 50:50 | 5 |
| 93 | — | — | — | — | — | — | 50:50 | 5 |

TABLE 10

| | Press formability | | | | | | | | | Corrosion resistance SST Area of rust generated 17 hours later | Dissolution of the film in an alkaline solution | Chemical processing | Blocking resistance | Paint Dryness | Stability of coating composition |
|---|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | | | | | | |
| No. | *1 (t) | *2 | *3 | *1 (t) | *2 | *3 | *1 (t) | *2 | *3 | | | | | | |
| 71 | 3 | ⊚ | ○ | 2 | ⊚ | ○ | 1 | ⊚ | ○ | 5 | ○ | ⊚ | ⊚ | ⊚ | ⊚ |
| 72 | 4 | ⊚ | ○ | 3 | ⊚ | ○ | 2 | ⊚ | ○ | 5 | Δ | ○ | ⊚ | ⊚ | ⊚ |
| 73 | 3 | ⊚ | ○ | 2 | ⊚ | ○ | 1 | ⊚ | ○ | 5 | ○ | ⊚ | ⊚ | ⊚ | ⊚ |
| 74 | 4 | ⊚ | ○ | 3 | ⊚ | ○ | 2 | ⊚ | ○ | 5 | ○ | ⊚ | ⊚ | ⊚ | ⊚ |
| 75 | 3 | ⊚ | ○ | 2 | ⊚ | ○ | 1 | ⊚ | ○ | 5 | ○ | ⊚ | ⊚ | ⊚ | ⊚ |
| 76 | 3 | ⊚ | ○ | 2 | ⊚ | ○ | 1 | ⊚ | ○ | 5 | ○ | ⊚ | ⊚ | ⊚ | ⊚ |
| 77 | 5 | ⊚ | ○ | 4 | ⊚ | ○ | 3 | ⊚ | ○ | 5 | Δ | ○ | ⊚ | ⊚ | ⊚ |
| 78 | 5 | ⊚ | ○ | 4 | ⊚ | ○ | 3 | ⊚ | ○ | 5 | Δ | ○ | ⊚ | ⊚ | ⊚ |
| 79 | 5 | ⊚ | ○ | 4 | ⊚ | ○ | 3 | ⊚ | ○ | 5 | Δ | ○ | ⊚ | ⊚ | ⊚ |
| 80 | 4 | ⊚ | ○ | 3 | ⊚ | ○ | 2 | ⊚ | ○ | 5 | ○ | ⊚ | ⊚ | ⊚ | ⊚ |
| 81 | 4 | ⊚ | ○ | 3 | ⊚ | ○ | 2 | ⊚ | ○ | 5 | ○ | ⊚ | ⊚ | ⊚ | ⊚ |
| 82 | 4 | ⊚ | ○ | 3 | ⊚ | ○ | 2 | ⊚ | ○ | 10 | ○ | ⊚ | ⊚ | ⊚ | ⊚ |
| 83 | 4 | ⊚ | ○ | 3 | ⊚ | ○ | 2 | ⊚ | ○ | 5 | Δ | ○ | ⊚ | ⊚ | ⊚ |
| 84 | 4 | ⊚ | ○ | 3 | ⊚ | ○ | 2 | ⊚ | ○ | 5 | Δ | ○ | ⊚ | ⊚ | ⊚ |
| 85 | 4 | ⊚ | ○ | 3 | ⊚ | ○ | 2 | ⊚ | ○ | 5 | ○ | ⊚ | ⊚ | ⊚ | ○ |
| 86 | 4 | ⊚ | ○ | 3 | ⊚ | ○ | 2 | ⊚ | ○ | 10 | ○ | ⊚ | ⊚ | ⊚ | ⊚ |
| 87 | 4 | ⊚ | ○ | 3 | ⊚ | ○ | 2 | ⊚ | ○ | 5 | Δ | ○ | ⊚ | ⊚ | ⊚ |
| 88 | 4 | ⊚ | ○ | 3 | ⊚ | ○ | 2 | ⊚ | ○ | 5 | ○ | ⊚ | ⊚ | ⊚ | ○ |
| 89 | 4 | ⊚ | ○ | 3 | ⊚ | ○ | 2 | ⊚ | ○ | 10 | ○ | ⊚ | ⊚ | ⊚ | ⊚ |
| 90 | 4 | ⊚ | ○ | 3 | ⊚ | ○ | 2 | ⊚ | ○ | 5 | ○ | ⊚ | ⊚ | ⊚ | ⊚ |
| 91 | 4 | ⊚ | ○ | 3 | ⊚ | ○ | 2 | ⊚ | ○ | 5 | Δ | ○ | ⊚ | ⊚ | ○ |
| 92 | 4 | ⊚ | ○ | 3 | ⊚ | ○ | 2 | ⊚ | ○ | 5 | ○ | ⊚ | ⊚ | ⊚ | ⊚ |
| 93 | 5 | ⊚ | ○ | 4 | ⊚ | ○ | 3 | ⊚ | ○ | 5 | ○ | ⊚ | ⊚ | ⊚ | ⊚ |

*1 Limiting blank holding force
*2 Galling resistance
*3 Powdering resistance

TABLE 11-1

| | | Methacrylic resin | | | | | | Neutralizer for methacrylic resin | |
|---|---|---|---|---|---|---|---|---|---|
| | Type | Monomer composition for polymer (mole %) | | | | | Acid | Molecular | Type and | Equivalent to carboxyl |
| No. | of steel | A | B | C | D | E | value | weight | mixing ratio | group |
| 94 | S | Styrene (20) | n-Butyl methacrylate (28) | Methacrylic acid (17) | — | Octaethylene glycol monomethyl acrylate (35) | 200 | 35000 | a:g = 75:25 | 1.3 |
| 95 | T | Styrene (20) | n-Butyl methacrylate (28) | Methacrylic acid (17) | — | Octaethylene glycol monomethyl acrylate (35) | 200 | 35000 | a:g = 75:25 | 1.3 |
| 96 | U | Styrene (23) | n-Butyl methacrylate (46) | Methacrylic acid (12) | — | Octaethylene glycol monomethyl acrylate (19) | 130 | 35000 | a:g = 75:25 | 1.3 |
| 97 | V | Styrene (20) | n-Butyl methacrylate (28 ) | Methacrylic acid (17) | — | Octaethylene glycol monomethyl acrylate (35) | 200 | 35000 | a:g = 75:25 | 1.3 |
| 98 | W | Styrene (20) | n-Butyl methacrylate (28) | Methacrylic acid (17) | — | Octaethylene glycol monomethyl acrylate (35) | 200 | 35000 | a:g = 75:25 | 1.3 |
| 99 | X | Styrene (20) | n-Butyl methacrylate (28) | Methacrylic acid (17) | — | Octaethylene glycol monomethyl acrylate (35) | 200 | 35000 | a:g = 75:25 | 1.3 |
| 100 | Y | Styrene (20) | n-Butyl methacrylate (28) | Methacrylic acid (17) | — | Octaethylene glycol monomethyl acrylate (35) | 200 | 35000 | a:g = 75:25 | 1.3 |
| 101 | S | Styrene (18) | n-Butyl Methacrylate (26) | Methacrylic acid (24) | — | Eicosaethylene glycol monomethyl acrylate (35) | 270 | 35000 | a:g = 75:25 | 1.3 |
| 102 | S | Styrene (18) | n-Butyl methacrylate (26) | Methacrylic acid (24) | — | Octaethylene glycol monomethyl acrylate (32) | 190 | 35000 | a:g = 75:25 | 1.3 |
| 103 | S | Styrene (36) | n-Butyl methacrylate (21) | Methacrylic acid (12) | — | Octaethylene glycol monomethyl acrylate (31) | 150 | 35000 | a | 1.3 |
| 104 | S | Styrene (17) | n-Butyl methacrylate (34) | Methacrylic acid (2) | — | Octaethylene glycol monomethyl acrylate (47) | 45 | 35000 | a | 1.3 |
| 105 | S | Styrene (11) | n-Butyl methacrylate (39) | Methacrylic acid (7) | — | Octaethylene glycol monomethyl acrylate (44) | 112 | 35000 | a | 1.3 |
| 106 | S | Styrene (31) | n-Butyl methacrylate (44) | Methacrylic acid (25) | — | — | 200 | 35000 | a:g = 75:25 | 1.3 |

TABLE 11-2

| | Supplementary component | | | | | | | Precipitation inhibitor | |
|---|---|---|---|---|---|---|---|---|---|
| | AD copolymer | | | | | Mixing ratio to methacrylic resin and method therefor | | | Additive amount to |
| No. | A | D | Mw | Equivalent of neutralizer (a) to acid equivalent | E | AD:AD copolymer ADE:ADE copolymer | Method Mix: Mixing Grf: Polymerizing | Type and mixing ratio p:q | solid component of coating resin (weight %) |
| 94 | Styrene (50) | Monomethyl maleate (50) | 3000 | 2.0 | — | AD = 20 | Mix | 50:50 | 5 |
| 95 | Styrene (50) | Monomethyl maleate (50) | 3000 | 2.0 | — | AD = 20 | Mix | 50:50 | 5 |
| 96 | Styrene (25) | Monomethyl maleate (75) | 1000 | 2.0 | — | AD = 30 | Mix | 50:50 | 5 |
| 97 | Styrene (25) | Monomethyl maleate (75) | 7000 | 2.0 | — | AD = 10 | Mix | 50:50 | 5 |
| 98 | Styrene (50) | Monomethyl maleate (50) | 3000 | 2.0 | — | AD = 20 | Mix | 50:50 | 5 |
| 99 | Styrene (50) | Monomethyl maleate (50) | 3000 | 2.0 | — | AD = 20 | Mix | 50:50 | 5 |
| 100 | Styrene (50) | Monomethyl maleate (50) | 3000 | 2.0 | — | AD = 20 | Mix | 50:50 | 5 |
| 101 | Styrene (50) | Monomethyl maleate (50) | 3000 | 2.0 | — | AD = 20 | Mix | 50:50 | 5 |
| 102 | Styrene (50) | Monomethyl maleate (50) | 3000 | 2.0 | — | AD = 20 | Mix | 50:50 | 5 |
| 103 | Styrene (50) | Monomethyl maleate (50) | 3000 | 2.0 | — | AD = 20 | Mix | 50:50 | 5 |
| 104 | Styrene (50) | Monomethyl maleate (50) | 3000 | 2.0 | — | AD = 5 | Mix | 50:50 | 5 |
| 105 | Styrene (50) | Monomethyl maleate (50) | 3000 | 2.0 | — | AD = 10 | Mix | 50:50 | 5 |
| 106 | Styrene (50) | Itaconic acid (50) | 3000 | 2.0 | Octamethylene glycol monomethyl methacrylate | AD = 20 E = 10 | Mix | 50:50 | 5 |

TABLE 12

| | Press formability | | | | | | | | Corrosion resistance SST Area of white rust generated 17 hours later | Dissolution of the film in an alkaline solution | Chemical processing | Blocking resistance | Paint Dryness | Stability of coating composition |
|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | | | | | |
| No. | *1 (t) | *2 | *3 | *1 (t) | *2 | *3 | *1 (t) | *2 | *3 | | | | | | |
| 94 | 4 | ⊙ | ○ | 3 | ⊙ | ○ | 3 | ⊙ | ○ | 5 | ○ | ○ | ⊙ | ⊙ | ⊙ |
| 95 | 2 | ⊙ | ○ | 2 | ⊙ | ○ | 1.5 | ⊙ | ○ | 20 | ○ | ○ | ⊙ | ⊙ | ⊙ |
| 96 | 5 | ⊙ | ○ | 5 | ⊙ | ○ | 4.5 | ⊙ | ⊙ | 20 | ○ | ○ | ⊙ | ⊙ | ⊙ |
| 97 | 2 | ⊙ | ○ | 2 | ⊙ | ○ | 1 | ⊙ | ⊙ | 0 | ○ | ○ | ⊙ | ⊙ | ⊙ |
| 98 | 3 | ⊙ | ○ | 2 | ⊙ | ○ | 1 | ⊙ | ⊙ | 0 | ○ | ○ | ⊙ | ⊙ | ⊙ |
| 99 | 4 | ⊙ | ○ | 3 | ⊙ | ○ | 2 | ⊙ | ⊙ | 5 | ○ | ○ | ⊙ | ⊙ | ⊙ |
| 100 | 4.5 | ⊙ | ○ | 3 | ⊙ | ○ | 2 | ⊙ | ○ | 5 | ○ | ○ | ⊙ | ⊙ | ⊙ |
| 101 | 4 | ⊙ | ○ | 4 | ⊙ | ○ | 3 | ⊙ | ○ | 5 | ○ | ○ | ⊙ | ⊙ | ⊙ |
| 102 | 4 | ⊙ | ○ | 4 | ⊙ | ○ | 3 | ⊙ | ○ | 5 | ○ | ○ | ⊙ | ⊙ | ⊙ |
| 103 | 4 | ⊙ | ○ | 4 | ⊙ | ○ | 3 | ⊙ | ○ | 0 | ○ | ○ | ⊙ | ⊙ | ⊙ |
| 104 | 4 | ⊙ | ○ | 3 | ⊙ | ○ | 2.5 | ⊙ | ○ | 5 | ○ | ○ | ⊙ | ⊙ | ⊙ |
| 105 | 4 | ⊙ | ○ | 3 | ⊙ | ○ | 2.5 | ⊙ | ○ | 5 | ○ | ○ | ⊙ | ⊙ | ⊙ |
| 106 | 3 | ⊙ | ○ | 3 | ⊙ | ○ | 2 | ⊙ | ○ | 5 | ○ | ○ | ⊙ | ⊙ | ⊙ |

*1 Limiting blank holding force
*2 Galling resistance
*3 Powdering resistance

TABLE 13-1

| | | Methacrylic resin | | | | | | | Neutralizer for methacrylic resin | |
|---|---|---|---|---|---|---|---|---|---|---|
| | Type | Monomer composition for polymer (mole %) | | | | | Acid | Molecular | Type and | Equivalent to |
| No. | of steel | A | B | C | D | E | value | weight | mixing ratio | carboxyl group |
| 107 | S | Styrene (31) | n-Butyl methacrylate (44) | Methacrylic acid (25) | — | — | 210 | 35000 | a:c = 50:50 | 1.3 |
| 108 | S | Styrene (14) | n-Butyl methacrylate (20) | Methacrylic acid (11) | Maleic acid (7) | Octaethylene glycol monomethyl acrylate (48) | 245 | 35000 | a:g = 75:25 | 1.3 |
| 109 | S | Styrene (24) | n-Butyl methacrylate (56) | Acrylic acid (20) | — | — | 185 | 40000 | a:d = 75:25 | 1.3 |
| 110 | S | Styrene (22) | n-Butyl methacrylate (50) | Acrylic acid (18) | Maleic acid (10) | — | 185 | 10000 | a:e = 75:25 | 1.3 |
| 111 | S | Styrene (31) | n-Butyl methacrylate (44) | Acrylic acid (25) | — | — | 240 | 35000 | a | 1.3 |
| 112 | S | Styrene (23) | n-Butyl methacrylate (62) | Acrylic acid (15) | — | — | 180 | 35000 | a | 1.3 |
| 113 | S | Styrene (13) | n-Butyl methacrylate (19) | Methacrylic acid (11) | Maleic acid (7) | Octaethylene glycol monomethyl acrylate (50) | 245 | 35000 | a | 1.3 |
| 114 | S | Styrene (16) | n-Butyl methacrylate (23) | Methacrylic acid (14) | Maleic acid (16) | Octaethylene glycol monomethyl acrylate (31) | 200 | 35000 | a | 1.3 |
| 115 | S | Styrene (26) | n-Butyl methacrylate (38) | Methacrylic acid (22) | Maleic acid (14) | — | 245 | 35000 | a | 1.3 |
| 116 | Y | Styrene (31) | n-Butyl methacrylate (44) | Methacrylic acid (25) | — | — | 193 | 35000 | a | 1.3 |
| 117 | S | Styrene (31) | n-Butyl methacrylate (44) | Methacrylic acid (25) | — | — | 193 | 35000 | a | 1.3 |
| 118 | S | Styrene (31) | n-Butyl methacrylate (44) | Methacrylic acid (25) | — | — | 204 | 35000 | a | 1.3 |
| 119 | S | Styrene (31) | n-Butyl methacrylate (44) | Methacrylic acid (25) | — | — | 150 | 35000 | a | 1.3 |
| 120 | S | Styrene (19) | n-Butyl methacrylate (32) | Methacrylic acid (15) | — | Octaethylene glycol monopropyl acrylate (33) | 233 | 35000 | a:g = 75:25 | 1.3 |
| 121 | S | Styrene (19) | n-Butyl methacrylate (32) | Methacrylic acid (15) | — | Octaethylene glycol monopropyl acrylate (33) | 233 | 35000 | a:g = 95:5 | 1.3 |

TABLE 13-2

| | Supplementary component | | | | | | | | |
|---|---|---|---|---|---|---|---|---|---|
| | AD copolymer | | | | | Mixing ratio to methacrylic resin and method therefor | | Precipitation inhibitor | |
| | | | | | | AD:AD | | Type and | Additive amount to |
| | | | | Equivalent of | | copolymer | Method | mixing | solid component of |
| | | | | neutralizer (a) to | | ADE:ADE | Mix:Mixing | ratio | coating resin |
| No. | A | D | Mw | acid equivalent | E | copolymer | Grf:Polymerizing | p:q | (weight %) |
| 107 | Styrene (50) | Itaconic acid (50) | 5000 | 2.0 | Pentadecaethylene glycol monomethyl methacrylate | AD = 30 E = 5 | Mix | 50:50 | 5 |
| 108 | — | — | — | — | — | — | — | 50:50 | 5 |
| 109 | — | Maleic acid (100) | — | — | — | D = 10 | Grf | 10:90 | 5 |
| 110 | — | Maleic acid (80) | — | — | Esterified compound of methacrylic acid-polyethylene glycol monomethyl ether (20) | DE = 5 | Mix | 90:10 | 5 |

TABLE 13-2-continued

| | Supplementary component | | | | | Mixing ratio to methacrylic resin and method therefor | | Precipitation inhibitor | |
|---|---|---|---|---|---|---|---|---|---|
| | AD copolymer | | | | | AD:AD copolymer ADE:ADE copolymer | Method Mix:Mixing Grf:Polymerizing | Type and mixing ratio p:q | Additive amount to solid component of coating resin (weight %) |
| No. | A | D | Mw | Equivalent of neutralizer (a) to acid equivalent | E | | | | |
| 111 | Styrene (9) | Maleic acid (15) | — | 2.0 | Octaethylene glycol monomethyl methacrylate (76) | ADE = 25 | Mix | 50:50 | 5 |
| 112 | Styrene (9) | Maleic acid (15) | — | 2.0 | Octaethylene glycol monomethyl methacrylate (76) | ADE = 25 | Grf | 50:50 | 5 |
| 113 | — | — | — | — | — | — | — | 50:50 | 5 |
| 114 | — | — | — | — | — | — | — | 50:50 | 5 |
| 115 | — | — | — | — | — | — | — | 50:50 | 5 |
| 116 | — | — | — | — | Octaethylene glycol monomethyl methacrylate (100) | E = 10 | Mix | 50:50 | 5 |
| 117 | — | — | — | — | Octaethylene glycol monomethyl methacrylate (100) | E = 15 | Mix | 50:50 | 5 |
| 118 | — | — | — | — | Pentaethylene glycol monomethyl methacrylate (100) | E = 5 | Grf | 50:50 | 5 |
| 119 | — | — | — | — | Octaethylene glycol monomethyl methacrylate (100) | E = 30 | Grf | 50:50 | 5 |
| 120 | — | — | — | — | — | — | — | 10:90 | 5 |
| 121 | — | — | — | — | — | — | — | 90:10 | 5 |

TABLE 14

| | Press formability | | | | | | | | Corrosion resistance | | | | | | |
|---|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | SST Area of white rust generated 17 hours later | Dissolution of the film in an alkaline solution | Chemical processing | Blocking resistance | Paint Dryness | Stability of coating composition |
| No. | *1 (t) | *2 | *3 | *1 (t) | *2 | *3 | *1 (t) | *2 | *3 | | | | | | |
| 107 | 4 | ◎ | ○ | 3 | ◎ | ○ | 2 | ◎ | ○ | 5 | ○ | ○ | ◎ | ◎ | ◎ |
| 108 | 4 | ◎ | ○ | 3 | ◎ | ○ | 2 | ◎ | ○ | 5 | ○ | ○ | ◎ | ◎ | ◎ |
| 109 | 4 | ◎ | ○ | 3 | ◎ | ○ | 3 | ◎ | ○ | 5 | ○ | ○ | ◎ | ◎ | ◎ |
| 110 | 3 | ◎ | ○ | 3 | ◎ | ○ | 2 | ◎ | ○ | 5 | ○ | ○ | ◎ | ◎ | ◎ |
| 111 | 4 | ◎ | ○ | 3 | ◎ | ○ | 3 | ◎ | ○ | 5 | ○ | ○ | ◎ | ◎ | ◎ |
| 112 | 4 | ◎ | ○ | 4 | ◎ | ○ | 3 | ◎ | ○ | 5 | ○ | ○ | ◎ | ◎ | ◎ |
| 113 | 3 | ◎ | ○ | 3 | ◎ | ○ | 2 | ◎ | ○ | 5 | ○ | ○ | ◎ | ◎ | ◎ |
| 114 | 4 | ◎ | ○ | 4 | ◎ | ○ | 3 | ◎ | ○ | 0 | ○ | ○ | ◎ | ◎ | ◎ |
| 115 | 4 | ◎ | ○ | 4 | ◎ | ○ | 3 | ◎ | ○ | 0 | ○ | ○ | ◎ | ◎ | ◎ |
| 116 | 3 | ◎ | ○ | 3 | ◎ | ○ | 2 | ◎ | ○ | 5 | ○ | ○ | ◎ | ◎ | ◎ |
| 117 | 3 | ◎ | ○ | 3 | ◎ | ○ | 2 | ◎ | ○ | 5 | ○ | ○ | ◎ | ◎ | ◎ |
| 118 | 3 | ◎ | ○ | 2 | ◎ | ○ | 2 | ◎ | ○ | 0 | ○ | ○ | ◎ | ◎ | ◎ |
| 119 | 3 | ◎ | ○ | 2 | ◎ | ○ | 2 | ◎ | ○ | 5 | ○ | ○ | ◎ | ◎ | ◎ |
| 120 | 4 | ◎ | ○ | 4 | ◎ | ○ | 3 | ◎ | ○ | 0 | ○ | ○ | ◎ | ◎ | ◎ |
| 121 | 4 | ◎ | ○ | 4 | ◎ | ○ | 3 | ◎ | ○ | 0 | ○ | ○ | ◎ | ◎ | ◎ |

*1 Limiting blank holding force
*2 Galling resistance
*3 Powdering resistance

TABLE 15-1

| | | Methacrylic resin | | | | | | | Neutralizer for methacrylic resin | |
|---|---|---|---|---|---|---|---|---|---|---|
| | Type | Monomer composition for polymer (mole %) | | | | | Acid | Molecular | Type and | Equivalent to |
| No. | of steel | A | B | C | D | E | value | weight | mixing ratio | carboxyl group |
| 1 | T | — | Butyl methacrylate (78) | Methacrylic acid (22) | — | — | 150 | 35000 | a | 1.3 |
| 2 | T | Styrene (28) | Methyl methacrylate (52) | Methacrylic acid (20) | — | — | 150 | 35000 | a | 1.3 |
| 3 | T | Styrene (22) | Butyl methacrylate (61) | Methacrylic acid (17) | — | — | 150 | 35000 | a | 1.3 |
| 4 | T | Styrene (22) | Methyl methacrylate (61) | Methacrylic acid (17) | — | — | — | 35000 | — | Not required due to emulsion |
| 5 | T | — | Methyl methacrylate (40) Butyl methacrylate (45) | Acrylic acid (5) | — | — | 62 | 35000 | a | 1.3 |
| 6 | T | Styrene (22) | Methyl methacrylate (61) | Methacrylic acid (17) | — | — | — | 35000 | — | Not required due to emulsion |
| 7 | S | Styrene (24) | Methyl methacrylate (55) | Methacrylic acid (21) | — | — | 150 | 10000 | a | 1.3 |
| 8 | S | — | Methyl methacrylate (40) Butyl methacrylate (45) | Acrylic acid (5) | — | — | 62 | 35000 | a | 1.3 |
| 9 | S | Styrene (13) | Methyl methacrylate (36) Butyl acrylate (36) | Methacrylic acid (15) | — | — | 100 | 20000 | a | 1.3 |

TABLE 15-2

| | Supplementary component | | | | | | | | Precipitation inhibitor | |
|---|---|---|---|---|---|---|---|---|---|---|
| | AD copolymer | | | | | Mixing ratio to methacrylic resin and method therfor | | | | |
| | | | | | | AD:AD copolymer ADE:ADE | | Others | Type and | Additive amount to |
| No. | A | D | Mw | Equivalent of neutralizer (a) to acid equivalent | E | copolymer | Method | Additive amount to solid component of coating resin (weight %) | mixing ratio p:q | solid component of coating resin (weight parts) |
| 1 | — | — | — | — | — | — | — | Calcium stearate: 5 Polyethylene wax: 10 Zinc phosphate: 5 | — | — |
| 2 | — | — | — | — | — | — | — | Calcium stearate: 5 Polyethylene wax: 10 Zinc phosphate: 5 | — | — |
| 3 | Styrene (50) | Maleic acid (50) | 2000 | 2 | — | AD = 15 | Mix | Calcium stearate:5 Polyethylene wax: 10 Zinc phosphate: 5 | — | — |
| 4 | — | — | — | — | — | — | — | Calcium stearate: 5 Polyethylene wax: 10 Zinc phosphate: 5 | — | — |
| 5 | — | — | — | — | — | — | — | Calcium stearate: 5 Polyethylene wax: 10 Zinc phosphate: 5 | — | — |
| 6 | — | — | — | — | — | — | — | Zinc aluminum phosphate: 6 Zinc ferrite: 6 | — | — |
| 7 | — | — | — | — | — | — | — | Calcium stearate: 5 Polyethylene wax: 10 Zinc phosphate: 5 | — | — |
| 8 | — | — | — | — | — | — | — | Calcium stearate: 5 Equivalent molar mixture of allylsulfoamide acetic acid and morpholine: 2 | — | — |
| 9 | — | — | — | — | — | — | — | Calcium stearate: 5 Equivalent molar mixture of allylsulfoamide acetic acid and morpholine: 2 | — | — |

TABLE 16

| | Press formability | | | | | | | | | Corrosion resistance | | Dissolution | | | | |
|---|---|---|---|---|---|---|---|---|---|---|---|---|---|---|---|---|
| | Deep-drawing processing for cylinder (25° C.) | | | Deep-drawing processing for cylinder (80° C.) | | | Deep-drawing processing for cylinder with bead (80° C.) | | | Stack | SST Area of rust generated 17 | of the film in an alkaline | Chemical pro- | Block-ing resis- | Paint Dry- | Stability of coating |
| No. | *1 (t) | *2 | *3 | *1 (t) | *2 | *3 | *1 (t) | *2 | *3 | (H) | hours later | solution | cessing | tance | ness | composition |
| 1 | <1 | △ | △ | <1 | △ | △ | <1 | △ | △ | 24 | — | ○ | ○ | △ | ⊙ | △ |
| 2 | 1 | ○ | △ | <1 | ○ | △ | <1 | ○ | △ | 36 | — | ○ | ○ | ○ | △ | △ |
| 3 | 1 | ○ | △ | <1 | ○ | △ | <1 | ○ | △ | 36 | — | ○ | ○ | ○ | ⊙ | △ |
| 4 | <1 | ○ | △ | <1 | ○ | △ | <1 | ○ | △ | 24 | — | X | X | ○ | △ | △ |
| 5 | <1 | △ | △ | <1 | △ | △ | <1 | △ | △ | 24 | — | △ | △ | X | ○ | △ |
| 6 | <1 | △ | X | <1 | △ | X | <1 | △ | X | 36 | — | X | X | ○ | △ | △ |
| 7 | 1 | △ | △ | <1 | △ | △ | <1 | △ | △ | — | 100 | ○ | ○ | ○ | △ | △ |
| 8 | <1 | △ | X | <1 | △ | X | <1 | △ | X | — | 100 | X | X | X | △ | △ |
| 9 | 1 | △ | △ | <1 | △ | △ | <1 | △ | △ | — | 100 | ○ | ○ | X | △ | △ |

*1 Limiting blank holding force
*2 Galling resistance
*3 Powdering resistance

INDUSTRIAL APPLICABILITY

A coating composition according to the present invention and a lubricated metal sheet having surfaces coated by the coating composition have superior dissolution of the film in an alkaline solution, chemical processing, corrosion resistance, paint dryness, blocking resistance and stability of coating composition. In addition, press formability including galling resistance and powdering resistance can be remarkably improved. Therefore, according to the present invention, difficulties in press forming which have been the problems are suppressed, so that the coating composition and the lubricated metal sheet therewith can be suitably used for parts of automobiles and the like.

What is claimed is:

1. A coating composition comprising a methacrylic resin prepared by copolymerizing:
   styrene or a substituted styrene (A);
   a methacrylic ester obtained from an alcohol having at least two carbon atoms and methacrylic acid (B); and
   an olefinic compound having at least one carboxlic group (C);
   wherein the molar ration, (A):(B):(C), is 1:0.05 to 44.5:0.12 to 13 and
   wherein the methacrylic resin is mixed or graft-copolymerized with a copolymer prepared by copolymerizing:
   styrene or a substitute styrene (A); and
   at least one selected from olefinic dicarboxylic monoesters (D).

2. The coating composition according to claim 1, wherein the methacrylic resin is mixed or graft-copolymerized with a polyalkylene glycol ester of an olefinic compound having at least one carboxylic group (E).

3. A coating composition comprising a methacrylic resin prepared by copolymerizing:
   styrene or a substituted styrene (A);
   a methacrylic ester obtained from an alcohol having at least two carbon atoms and methacrylic acid (B); and
   an olefinic compound having at least one carboxylic group (C);
   wherein the molar ratio, (A):(B):(C), is 1:0.05 to 44.5:0.12 to 13 and
   wherein the methacrylic resin is a methacrylic resin prepared by copolymerizing:
   the monomers for the methacrylic resin; and
   a polyalkylene glycol ester of an olefinic compound having at least one carboxylic group (E).

4. The coating composition according to claim 3, wherein the methacrylic resin is mixed with a copolymer prepared by copolymerizing:
   styrene or a substituted styrene (A); and
   at least one selected from olefinic dicarboxylic monoesters (D).

5. A coating composition comprising a methacrylic resin prepared by copolymerizing:
   styrene or a substituted styrene (A);
   a methacrylic ester obtained from an alcohol having at least two carbon atoms and methacrylic acid (B); and
   an olefinic compound having at least one carboxylic group (C);
   wherein the molar ratio, (A):(B):(C), is 1:0.05 to 44.5:0.12 to 13 and
   wherein the methacrylic resin is a methacrylic resin prepared by copolymerizing:
   the monomers for the methacrylic resin; and
   at least one selected from olefinic dicarboxylic monoesters (D), wherein the molar ratio thereof to styrene or a substituted styrene (A) is 0.06 to 6.0.

6. The coating composition according to claim 5, wherein the methacrylic resin is mixed or graft-copolymerized with a polyalkylene glycol ester of an olefinic compound having at least one carboxylic group (E).

7. A coating composition comprising a methacrylic resin prepared by copolymerizing:
   styrene or a substituted styrene (A);
   a methacrylic ester obtained from an alcohol having at least two carbon atoms and methacrylic acid (B); and
   an olefinic compound having at least one carboxylic group (C);
   wherein the molar ratio, (A):(B):(C), is 1:0.05 to 44.5:0.12 to 13 and
   wherein the methacrylic resin is a methacrylic resin prepared by copolymerizing:
   the monomers for the methacrylic resin;
   at least one selected from olefinic dicarboxylic monoesters (D), and
   a polyalkylene glycol ester of an olefinic compound having at least one carboxylic group (E), wherein molar ratios of at least one selected from olefinic dicarboxylic monoesters (D) and a polyalkylene glycol ester of an olefinic compound having at least one carboxylic group (E) to styrene or a substitute styrene (A) are 0.06 to 6.0, and 0.001 to 2.7, respectively.

8. The coating composition according to claim 1, further comprising at least one of amines having a boiling point not less than 160° C.

9. The coating composition according to claim 1, further comprising at least one selected from the group consisting of a zinc salt, a calcium salt, and an ammonium salt of a phosphoric acid and a molybdic acid.

10. The coating composition according to claim 1, further comprising at least one selected from the group consisting of a higher carboxylic acid, a higher carboxylic ester, a metallic soap, and a polyethylenic wax.

11. The coating composition according to claim 1, further comprising:
　at least one selected from the group consisting of a zinc salt, a calcium salt, and an ammonium salt of a phosphoric acid-and a molybdic acid; and
　at least one selected from the group consisting of a higher carboxylic acid, a higher carboxylic ester, a metallic soap, and a polyethylenic wax.

12. The coating composition according to claim 8, further comprising at least one selected from the group consisting of a zinc salt, a calcium salt, and an ammonium salt of a phosphoric acid and a molybdic acid.

13. The coating composition according to claim 8, further comprising at least one selected from the group consisting of a higher carboxylic acid, a higher carboxylic ester, a metallic soap, and a polyethylenic wax.

14. The coating composition according to claim 8, further comprising:
　at least one selected from the group consisting of a zinc salt, a calcium salt, and an ammonium salt of a phosphoric acid and a molybdic acid; and
　at least one selected from the group consisting of a higher carboxylic acid, a higher carboxylic ester, a metallic soap, and a polyethylenic wax.

15. The coating composition according to claim 1, further comprising:
　at least one selected from the group consisting of a zinc salt, a calcium salt, and an ammonium salt of a phosphoric acid and a molybdic acid; and
　at least one of alkyl phosphonic esters.

16. The coating composition according to claim 1, further comprising:
　at least one selected from the group consisting of a zinc salt, a calcium salt, and an ammonium salt of a phosphoric acid and a molybdic acid;
　at least one selected from the group consisting of a higher carboxylic acid, a higher carboxylic ester, a metallic soap, and a polyethylenic wax; and
　at least one of alkyl phosphonic esters.

17. The coating composition according to claim 8, further comprising:
　at least one selected from the group consisting of a zinc salt, a calcium salt, and an ammonium salt of a phosphoric acid and a molybdic acid; and
　at least one of alkyl phosphonic esters.

18. The coating composition according to claim 8, further comprising:
　at least one selected from the group consisting of a zinc salt, a calcium salt, and an ammonium salt of a phosphoric acid and a molybdic acid;
　at least one selected from the group consisting of a higher carboxylic acid, a higher carboxylic ester, a metallic soap, and a polyethylenic wax; and
　at least one of alkyl phosphonic esters.

19. A lubricated metal sheet to which the coating composition according to claim 1 is applied.

* * * * *